United States Patent
Arnold et al.

(10) Patent No.: US 10,250,868 B1
(45) Date of Patent: Apr. 2, 2019

(54) SYNCHRONIZING DATA STREAMS

(71) Applicant: Amazon Technologies, Inc., Seattle, WA (US)

(72) Inventors: Brad Nathaniel Arnold, Bellevue, WA (US); Sajesh Kumar Saran, Bothell, WA (US); Scot Burzawa, Lynwood, WA (US); Christopher Samuel Zakian, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/473,146

(22) Filed: Mar. 29, 2017

(51) Int. Cl.
| | |
|---|---|
| *H04N 13/296* | (2018.01) |
| *G11B 20/14* | (2006.01) |
| *G11B 27/19* | (2006.01) |
| *H04N 13/257* | (2018.01) |

(52) U.S. Cl.
CPC ........ *H04N 13/296* (2018.05); *G11B 20/1411* (2013.01); *G11B 27/19* (2013.01); *H04N 13/257* (2018.05)

(58) Field of Classification Search
CPC .......... G11B 20/1411; G11B 20/10527; G11B 27/19; H04N 13/296; H04N 13/257; G01G 19/414
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 9,911,290 B1 | 3/2018 | Zalewski et al. | |
| 2011/0267344 A1* | 11/2011 | Germann | G06K 9/00201 345/420 |
| 2013/0284806 A1 | 10/2013 | Margalit | |
| 2013/0286012 A1* | 10/2013 | Medioni | G06T 17/00 345/420 |
| 2015/0036047 A1 | 2/2015 | Bledsoe | |
| 2017/0180708 A1* | 6/2017 | Hazeghi | H01S 5/0654 |
| 2017/0324949 A1 | 11/2017 | Chen et al. | |
| 2018/0088584 A1* | 3/2018 | Tascione | G05D 1/0231 |

OTHER PUBLICATIONS

Office Action for U.S. Appl. No. 15/279,212, dated Aug. 10, 2018, Sajesh Kumar Saran, "Synchronizing Data Streams", 29 pages.

* cited by examiner

*Primary Examiner* — Behrooz M Senfi
(74) *Attorney, Agent, or Firm* — Lee & Hayes, P.C.

(57) ABSTRACT

This disclosure describes techniques for synchronizing data streams. In some instances, a computing device couples to multiple sensors, such as cameras, and applies accurate timestamp information to the individual frames of sensor data from the independent sensors. After aligning these data streams by applying these accurate timestamps, the computing device may, in some instances, encode and transmit these timestamped data streams to one or more entities for further processing. In one example, a first camera (e.g., a depth camera configured to generate a depth map) may capture images of an environment, as may a second camera (e.g., an Red-Green-Blue (RGB) camera configured to generate color images). The resulting images may be temporally aligned with one another via the timestamping, and the resulting aligned images from both the depth sensor and the RGB camera may be used to create a three-dimensional (3D) model of the environment.

20 Claims, 13 Drawing Sheets

SYNCHRONIZING DATA STREAMS

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
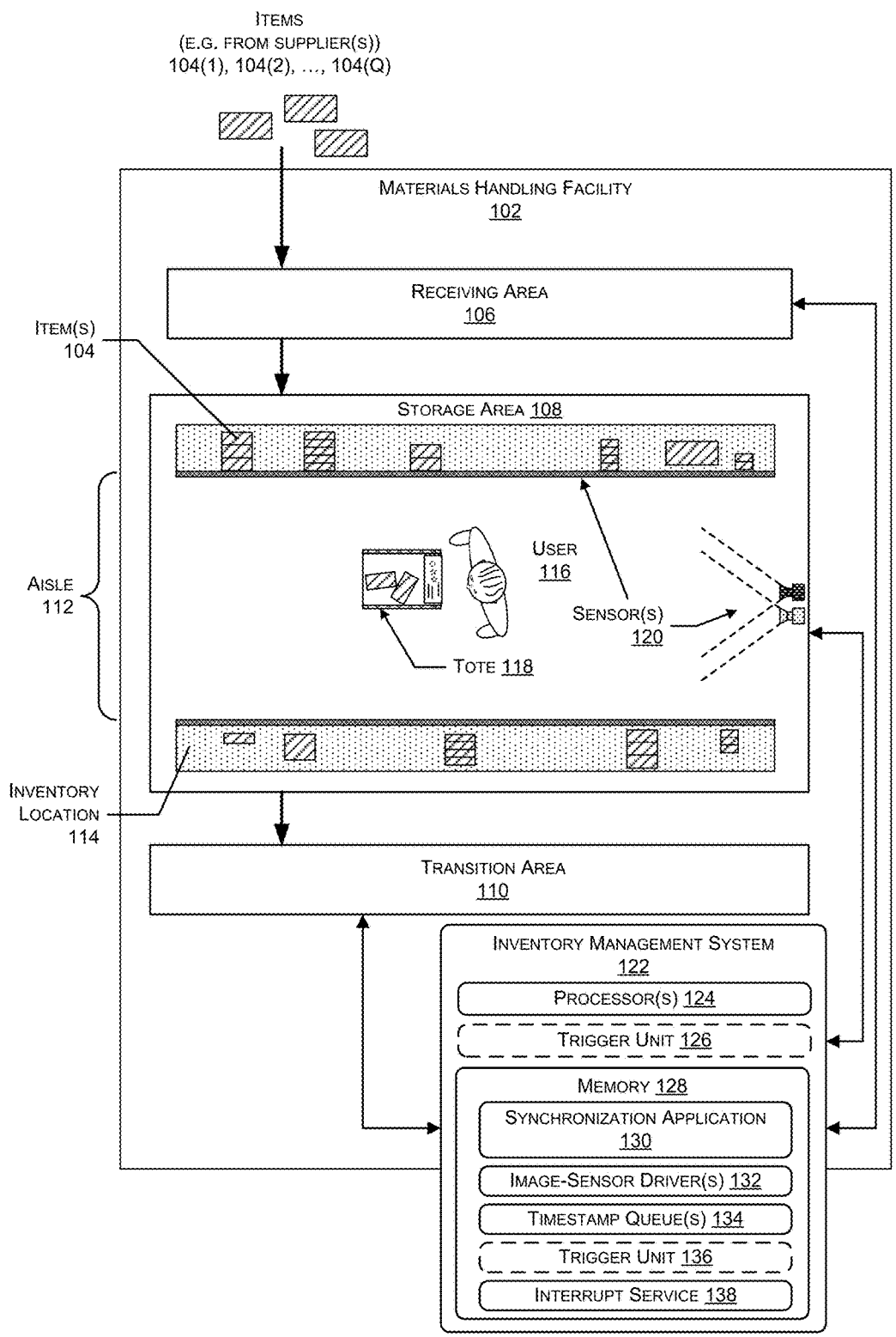
FIG. 1 is a block diagram illustrating a materials handling facility (facility) configured to use sensors, such as cameras.

This disclosure describes techniques for synchronizing independent sources of data. In some instances, one or more computing devices may couple to multiple independent sensors, such as cameras, weight sensors, audio sensors, or the like, and may apply accurate timestamp information to the individual frames of sensor data from the independent sensors. After aligning these data streams by applying these accurate timestamps, the one or more computing devices may, in some instances, encode and transmit these time-stamped data streams to one or more entities for further processing. In one example, a first camera (e.g., a depth camera configured to generate a depth map) may capture images of an environment, as may a second camera (e.g., an Red-Green-Blue (RGB) camera configured to generate color images). The resulting images (e.g., video) may be temporally aligned with one another via the timestamping, and the resulting aligned images from both the depth sensor and the RGB camera may be used to create a three-dimensional (3D) model of the environment.

As described in detail below, the techniques may utilize timestamp queues to accurately apply timestamps to independent data streams captured by sensors coupled to a common computing device. It is noted, however, that while the following description discusses two data sensors, specifically cameras, the techniques may apply to any other type of sensor and to any number of homogeneous or heterogeneous sensors. Further, in some instances the techniques may be used to synchronize a first unit comprising two or more sensors (e.g., a depth camera and an RGB camera) with a second unit comprising two or more independent sensors (e.g., another depth camera and another RGB camera). In some instances, each camera couples to a computing device via a respective interface, such as a universal serial bus (USB) interface, MIPI camera serial interface (CSI), a display serial interface (DSI), a high-definition multimedia interface (HDMI), a wireless interface, and/or the like. Further, each independent camera may utilize a respective device driver that is executable on the one or more computing devices. Therefore, when the example first camera captures an image, the first camera may provide the image to its device driver for processing. Similarly, when the second camera captures an image, the second camera may provide this image to its device driver for processing.

Because these cameras couple to the one or more computing devices via different interfaces, which may require communicating via different protocols, the amount of time needed to process these different images may vary. That is, the amount of time for an image from a first sensor to makes its way through the processing pipeline may differ from that of an image acquired by a second sensor due to camera processing, data transfer delay by the transfer rate of the interfaces (e.g., USB versus CSI, etc.), driver processing delay, (e.g., raw video frame assembly, etc.) and jitter due to non-real time reading of frames.

In order to synchronize these data streams, the techniques described below use timestamp queues to reliably apply timestamps to each frame received from a respective driver. In the above example of a depth sensor and an RGB camera, the techniques may create a first timestamp queue for use with the images acquired by the depth sensor and a second timestamp queue for use with the images acquired by the RGB camera. In addition, the techniques may configure both the depth sensor and the RGB camera to operate in trigger mode, where an external trigger received by the respective sensor causes the sensor to acquire a single image and send it to the sensor's respective driver.

In some examples, the external trigger comprises a pulse generated by hardware, firmware, or software. For instance, the techniques may utilize a hardware-based pulse-width-modification (PWM) unit that generates periodic pulses that, when received by a respective sensor, cause the sensor to acquire a frame of data. Of course, while some instances utilize the PWM unit, a trigger signal may be generated using any of type of trigger unit implemented in other types of hardware, software, or a combination thereof. Further, the rate of the pulse and the implementation of the particular trigger unit used to generate the pulses may vary based on the requirements of the application that will ultimately use the aligned data streams. Regardless of whether the trigger unit is embodied in hardware or software, in some instances each sensor (e.g., the depth sensor and the RGB camera in the current example) may couple to the same output line of the trigger unit. By coupling the sensors to the trigger unit in this manner, each sensor receives the periodic pulses at a same time, resulting in each sensor acquiring a frame of data (e.g., an image) substantially contemporaneously with one another.

In addition to setting up a timestamp queue for each sensor, the techniques sets up an interrupt service that is configured to generate timestamp data and store this data in each respective timestamp queue. As described further below, in response to the PWM unit or other trigger generating a pulse, an interrupt is also generated and received by the processor of the computing device, which in turn invokes the interrupt service. When the interrupt service is called, this service acquires the current time and stores this current time as a timestamp in each respective queue. The interrupt service couples to the same output line of the PWM unit as the sensors, such that when the PWM unit generates a pulse, the interrupt service receives the interrupt substantially contemporaneously with the pulse being received by the sensors. The interrupt service then generates a first timestamp specifying the current time (i.e., the time at which each sensor acquired the current frame) and stores this first timestamp in the first timestamp queue. In addition, the interrupt service generates a second timestamp also specifying the same, current time and stores this second timestamp in the second timestamp queue.

A synchronization application, stored in memory of the one or more computing devices, then awaits receiving the respective data frames from the respective drivers. Upon receiving the first image from the depth sensor, in this example, the application acquires the first timestamp from the first timestamp queue and associates this timestamp with the first image from the depth sensor. That is, the first timestamp queue operates as a first-in-first-out (FIFO) queue, such that the application takes the next timestamp "in line" and associates it with the first image. This may include storing the timestamp as metadata as part of the image, such as in a header portion of the image file. Further, the timestamp information may be added to the image using any other type of embedded metadata techniques or may be added by storing the metadata externally to but in association with the image. In either instance, the metadata is used to identify the timestamp value associated with the respective image, whether determined by analyzing a header or other structural portion of the image, or by identifying a location of the metadata for a particular image stored external to the image.

Similarly, when the synchronization application receives the image acquired by the RGB camera, the synchronization application may acquire the second timestamp specifying the same time as the first timestamp from the second timestamp queue and may associate this second timestamp with the RGB image. Again, the second timestamp queue may operate as a FIFO queue, such that the synchronization application acquires the timestamp that is next in line. Again, the second timestamp may be stored as metadata in association with the RGB image (e.g., as part of a header of the image file). It is noted that because of the potential processing delays between the depth driver and the RGB driver, the synchronization application may receive the depth images earlier or later than the RGB images. However, using the respective timestamp queues, the techniques may ensure that these images may be accurately timestamped and, thus, may be accurately aligned with one another using the timestamp information. Therefore, applications further down the processing pipeline may rely on these data streams being accurately synchronized with one another.

In some instances, the synchronization application may determine when to restart the synchronization process, such as due to frames being dropped, or the like. In this regard, the synchronization application may utilize an algorithm that determines when to restart the process based on the current state of the first timestamp queue and the current state of the second timestamp queue. For instance, this algorithm may take into account the differential between the amount of timestamps in each queue as well as the amount of time that these queues have had a differential. That is, if the queues have a same number of timestamps stored at a particular time, then the algorithm may determine that the process is healthy. If, however, the algorithm calculates that a large disparity exists in the number of stored timestamps in one queue relative to the other and/or that a differential has existed for a relatively long amount of time, then the process may be determined to need restarting. It is to be appreciated that the amount of imbalance between the queues and the amount of time may vary depending upon implementation details.

When the synchronization application determines to restart the synchronization process, the synchronization application may send a first instruction to the PWM unit to cease generating pulses—and, hence, ceasing the sensors from capturing further data frames. The synchronization application may then empty each queue (e.g., delete the contents of the first and second timestamp queues, delete and re-generate the first and second timestamp queues, etc.), empty or flush data lines between the sensors and the computing device, and, thereafter, may send a second instruction to the PWM unit to again begin generating pulses.

As will be appreciated, the described timestamp-queue techniques absorb inter-stream and intra-stream processing delay variations in the system by providing manner for real-time application of accurate timestamps to the data frames coming from independent sensors. The correct timestamping of individual frames improves synchronization of multiple data streams later in the processing pipeline.

While the examples described herein discuss the techniques applied to synchronizing videos, it is to be appreciated that the techniques may be used to synchronize any other type of data streams. Further, while a few example environments in which the techniques may be implemented are described below, it is to be appreciated that these are merely illustrative and that any other similar or different environments may implement the described techniques.

Further, while the above introduction describes synchronizing data streams, in other instances the techniques may apply to synchronizing sources of data provided by sensors in a non-streaming manner. Streaming, meanwhile, is sending data (e.g., a video stream) as a steady continuous flow, which allows for playback of the data while subsequent data in the stream is being received. To stream video data, the sending device may utilize an encoder to compress the video data and the receiving client may utilize a decoder to decode the streamed video data to allow for playback. In order to ensure that the client is able to playback the streamed video data continuously, the sending device may stream the video data at a constant or variable bit rate that is at least slightly less than the bandwidth capacity of the client.

Streaming involves protocols at several different layers, including the transport layer, the session layer, the presentation layer, and the application layer. The transport layer is responsible for getting data from one location to the other—in this instance from the sending device to the client. The session layer organizes the streamlining activity into corresponding ongoing unit, while the presentation layer manages the bridge between the information as seen by the receiving application at the client and the information that is sent over the network from the host server. The application layer is the level at which the sending and receiving applications talk to the network. In order to ensure timely delivery of the video data, the host server may utilize a User Datagram Protocol (UDP), which puts a premium on continuous delivery of information, rather than resending lost packets, as is typical for TCP communications.

In some instances, the sending device may utilize one or more Real Time Transport Protocols (RTPs), which is built atop UDP and is designed specifically for real-time data transfers. The RTP protocol operates at the transport layer and is closely associated with the Real-Time Control Protocol (RTCP), which operates at the session layer. The primary purpose of RTCP is to provide feedback on the quality of the data transport to allow modifications to the streaming, such as the adjusting of a bit rate. The Real-Time Streaming Protocol (RTSP) is a presentation-level protocol that allows for network controls, such as pause, play, and stop of the streamed video data. The RTP operating on the transport layer, the RTCP operating on the session layer, and the RTSP operating on the presentation layer is often collectively referred to "RTSP". Further, while one example has been described, it is to be appreciated that other streaming protocols can be utilized herein, such as Real Time Messaging Protocol (RTMP), Adaptive Bitrate Streaming, HTTP Live Streaming, Adobe® HTTP Dynamic Streaming, and the like.

FIG. 1 is a block diagram illustrating a materials handling facility (facility) configured to use sensors, such as cameras. A materials handling facility 102 (facility) may comprise one or more physical structures or areas within which one or more items 104(1), 104(2), . . . , 104(Q) may be held. As used in this disclosure, letters in parenthesis such as "(Q)" indicate an integer value. The items 104 may comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), . . . , 118(T), or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, weight sensors, cameras, proximity sensors, radio frequency (RF) receivers, microphones, temperature sensors, humidity sensors, vibration sensors, and so forth. In the illustrated example, the sensors include two cameras adjacent to one another, such as a depth sensor and an RGB camera that are used to generate a 3D model of the environment for tracking objects (e.g., items, users, etc.) through the environment. The sensors 120 may be stationary or mobile, relative to the facility 102. For example, the inventory locations 114, the totes 118, or other devices such as user devices, may contain sensors 120 configured to acquire sensor data. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110. For instance, the inventory management system may determine when a user picks an item from the inventory locations 114 and, in response, may update a virtual shopping cart associated with the respective user. For instance, if the illustrated user 116 removes a bottle of ketchup from a shelf in the facility 100, one or more sensors may indicate the removal of the item and the inventory management system 122 may store an indication that the virtual shopping cart of the user 116 includes a bottle of ketchup.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The inventory management system 122 may comprise one or more computing devices (e.g., servers) and, as illustrated, may include one or more processors 124, a hardware-based trigger unit 126, and memory 128. The memory 128 (and other memory described herein) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 128 may be implemented as non-transitory computer-readable storage media ("CRSM"), which may be any available physical media accessible by the processor(s) 112 to execute instructions stored on the memory 128. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 124.

As illustrated, the memory 128 may store a synchronization application 130, one or more image-sensor drivers 132 (and/or other sensor drivers), one or more timestamp queues 134, a software-based trigger unit 136, and an interrupt service 138. As the dashed line indicates, in some instances the inventory management system 122 may utilize the hardware-based trigger unit 126, while in other instances the system 122 may additionally or alternatively utilize the software-based trigger unit 136. In either instances, the trigger unit may be configured to generate periodic pulses that, when received by the example cameras, cause the cameras to acquire an image and send the image to each sensor's corresponding driver 132. In addition, a pulse generated by the trigger unit may also trigger an interrupt, resulting in the calling of the interrupt service 138. When called, the interrupt service 138 may generate a timestamp for each queue 134, with each timestamp specifying the current time (which also represents the time that the cameras captured each timestamp specifying the current time (which also represents the time that the cameras captured each respective image) and may store a respective timestamp in each respective queue. When the drivers 132 are finished processing their respective images, the synchronization application 130 may receive each image, acquire the next-in-line timestamp from the appropriate timestamp queue, and append this timestamp to the particular image.

For example, in instances where the system 122 includes the hardware-based trigger unit 126, an output pin of the trigger unit 126 may couple to respective trigger pins of respective sensors (e.g., cameras). When the trigger unit 126 generates a pulse, the cameras may receive each the pulse and generate sensor data (e.g., respective images). Furthermore, the output pin of the trigger unit 126 may couple to a particular interrupt line of the processors 124. Furthermore, the particular interrupt line may be associated with the invocation of the interrupt service 138 using the interrupt-service framework provided by the processor 124. That is, the interrupt-service framework may be used to store an indication that the interrupt service 138 is to be called upon the processor 124 receiving an interrupt from the particular interrupt line that is coupled to the trigger unit 126. Therefore, when the trigger unit 126 generates a pulse, an interrupt may be received at the processor 124 along the particular interrupt line that couples the trigger unit 126 to the processor 124. The processor 124 may reference the interrupt-service framework to determine to make a call to the interrupt service 138, which may store the timestamp data in the respective queues in response to being called.

In some instances, aligning these video streams via application of accurate timestamps to the independent cameras allows for creation of a 3D video of the environment that allows items to be tracked within the facility 102. For instance, the 3D video may be analyzed to determine that the user 106 has picked a particular item (e.g., the ketchup bottle) from the shelf, such that the item may be added to the user's virtual cart. In some instances this aligned video may be analyzed in unison with other sensor data, such as data from the weight sensors or the like.

Figure 2:
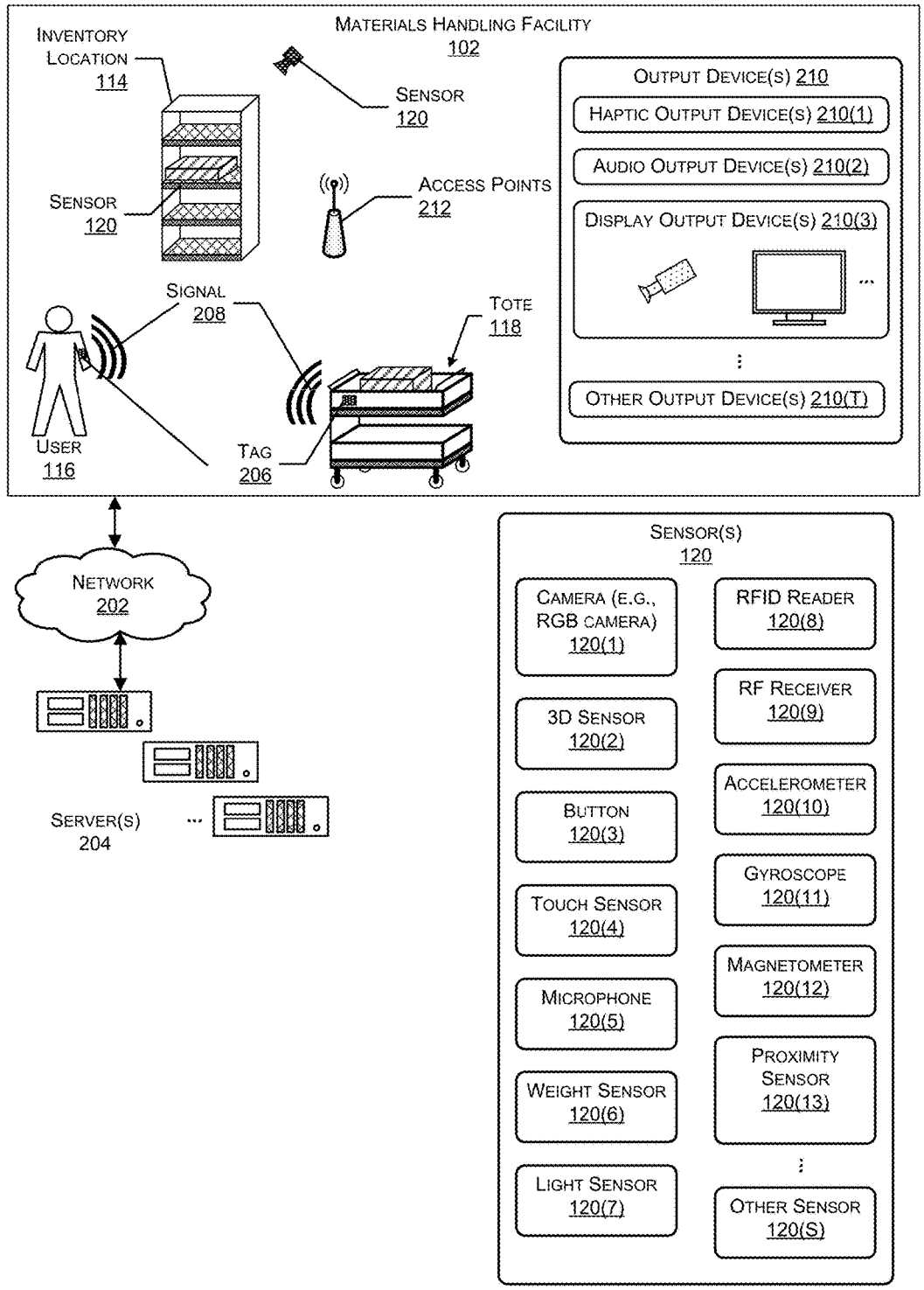
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The facility 102 may include one sensors 120, such as cameras, scale devices, and the like. The users 116, the totes 118, or other objects in the facility 102 may be equipped with one or more tags 206. The tags 206 are configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth® Low Energy (BLE) transmitter and battery. In other implementations, the tag 206 may use other techniques to indicate presence to a corresponding sensor or detector. For example, the tag 206 may be configured to generate an ultrasonic signal 208 that is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, that may be read and be used to determine identity and location. Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote(s) 118, may be carried or worn by the user(s) 116, and so forth.

The sensors 120 may include one or more cameras 120(1), such as RGB cameras. These cameras 120(1) may be configured to acquire images of a scene. The cameras 120(1) may be configured to detect light in one or more wavelengths including, but not limited to, terahertz, infrared, visible, ultraviolet, and so forth. The inventory management system 122 may use image data acquired by the cameras 120(1) during operation of the facility 102. For example, the inventory management system 122 may identify items 104, users 116, totes 118, and so forth, based at least in part on their appearance within the image data.

One or more 3D sensors 120(2) may also be included in the sensors 120. The 3D sensors 120(2) are configured to acquire spatial or three-dimensional data, such as depth information, about objects within a sensor field of view. The 3D sensors 120(2) may include depth sensors implemented as range cameras, time-of-flight sensors, lidar systems, sonar systems, radar systems, structured light systems, stereo vision systems, optical interferometry systems, coded aperture systems, and so forth.

The inventory management system 122 may use the three-dimensional data, potentially in combination with the camera data, to identify objects, determine one or more of a location, orientation, or position of an object. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the buttons 120(3) may be used to accept input from a user 116 such as a username and password associated with an account, configuration settings for a device, and so forth.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu, one or more particular items 104 for picking.

One or more microphones 120(5) may be configured to acquire audio data indicative of sound present in the environment. The sound may include user speech uttered by the user 116. In some implementations, arrays of microphones 120(5) may be used. These arrays may implement beam-forming or other techniques to provide for directionality of gain. The inventory management system 122 may use the one or more microphones 120(5) to accept voice input from the users 116, determine the location of one or more users 116 in the facility 102, and so forth.

One or more weight sensors 120(6) may be configured to measure the weight of a load on a platform, such as the weight of an item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, load cells, pneumatic pressure sensors, and so forth. The sensing mechanisms may operate as transducers that generate one or more signals based on an applied force, such as that of the load due to gravity. The inventory management system 122 may use the weight data to identify an object, determine a location of an object, maintain shipping records, and so forth. For example, the weight sensor 120(6) at a particular location in the facility 102 may report a weight of the user 116, indicating the user 116 is present at that location.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the output device 210.

One more radio frequency identification (RFID) readers 120(8), near field communication (NFC) systems, and so forth, may also be provided as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth.

One or more RF receivers 120(9) may also be provided. In some implementations, the RF receivers 120(9) may be part of transceiver assemblies. The RF receivers 120(9) may be configured to acquire RF signals 208 associated with Wi-Fi™, Bluetooth®, ZigBee®, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects or devices may be equipped with a gyroscope 120(11) to provide data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which way the user 116(1) is facing.

A proximity sensor 120(13) may be used to determine presence of an object, such as the user 116, the tote 118, and so forth. The proximity sensors 120(13) may use optical, electrical, ultrasonic, electromagnetic, or other techniques to determine a presence of an object. In some implementations, the proximity sensors 120(13) may use an optical emitter and an optical detector to determine proximity. For example, an optical emitter may emit light, a portion of which may then be reflected by the object back to the optical detector to provide an indication that the object is proximate to the proximity sensor 120(13). In other implementations, the proximity sensors 120(13) may comprise a capacitive proximity sensor 120(13) configured to provide an electrical field and determine a change in electrical capacitance due to presence or absence of an object within the electrical field.

The proximity sensors 120(13) may be configured to provide sensor data 130 indicative of one or more of a presence or absence of an object, a distance to the object, or characteristics of the object. An optical proximity sensor 120(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a camera 120(1). Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth. In some implementations, a proximity sensor 120(13) may be installed at the inventory location 114.

The sensors 120 may include other sensors 120(S) as well. For example, the other sensors 120(S) may include ultrasonic rangefinders, thermometers, barometric sensors, hygrometers, vibration sensors, or biometric input devices. Continuing the example, the biometric input devices may include, but are not limited to, fingerprint readers, palm scanners, and so forth.

The facility 102 may include one or more access points 212 configured to establish one or more wireless networks. The access points 212 may use Wi-Fi™, NFC, Bluetooth®, or other technologies to establish wireless communications between a device and the network 202. The wireless networks allow the devices to communicate with one or more of the inventory management system 122, the sensors 120, the tag 206, a communication device of the tote 118, or other devices. In other implementations, a wired networking infrastructure may be implemented. For example, cabling may be used to provide Ethernet local area network connectivity.

The output devices 210 may also be provided in the facility 102. The output devices 210 may be configured to generate signals that may be perceived by the user 116.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display output devices 210(3) may be configured to provide output that may be seen by the user 116 or detected by a light-sensitive detector such as a camera 120(1) or light sensor 120(7). The output from the display output devices 210(3) may be monochrome or color. The display output devices 210(3) may be emissive, reflective, or both emissive and reflective. An emissive display output device 210(3) is configured to emit light during operation. For example, a light emitting diode (LED) is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays, transparent organic LEDs, electrophoretic displays, image projectors, or other display mechanisms. The other display mechanisms may include, but are not limited to, microelectromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, display output devices 210(3) may be configurable to provide image or non-image output. For example, an electrophoretic display 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth.

For example, the other output devices 210(T) may include lights that are located on the inventory locations 114, the totes 118, and so forth.

Figure 3A:
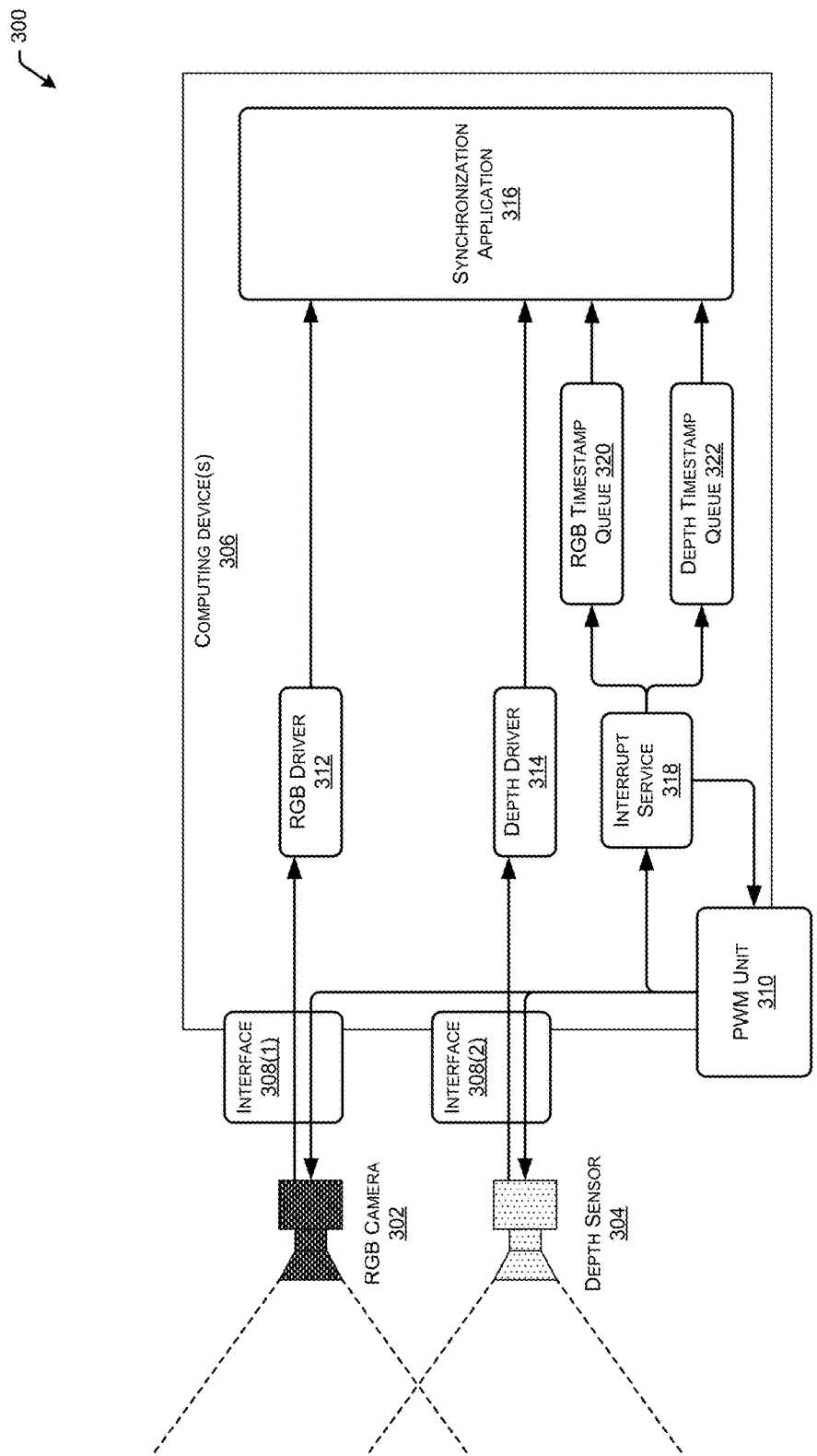
FIG. 3A illustrates an example system in which images (e.g., video) of an environment from a first camera may be synchronized with images of the environment from a second video sensor. For instance, a depth sensor may capture a series of images, which may be temporally aligned with images captured by an RGB camera, thus allowing for the creation of a three-dimensional (3D) model of the environment.

FIG. 3A illustrates an example system 300 in which images (e.g., video) of an environment from a first camera (here, an RGB camera 302) may be synchronized with images of the environment from a second video sensor (in this example, a depth sensor 304). As illustrated, the RGB camera 302 couples to a computing device 306 (representing one or more computing devices, such as those hosting the inventory management system 122) via a first interface 308(1). The interface 308(1) may comprise a USB interface, a DSI interface, or any other type of interface utilizing any type of protocol. The depth sensor 304, meanwhile, may couple to the computing device 306 via a second interface 308(2). Again, the interface 308(2) may comprise a USB interface, a DSI interface, or any other type of interface utilizing any type of protocol. In some instance, the interfaces 308(1) an 308(2) represent different interfaces utilizing different protocols and, hence, different data transfer rates and the like.

As illustrated, the computing device 306 further includes, in this example, a PWM unit 310, which may be implemented in hardware, software, or a combination thereof. Also as illustrated, the RGB camera 302 and the depth sensor 304 couple to a common pin of the PWM unit. In some instances, the PWM unit is configured to generate periodic pulses according to a predefined frequency, while the RGB camera 302 and the depth sensor 304 are configured to acquire respective images in response to receiving a pulse from the PWM unit. Further, because the RGB camera 302 and the depth sensor 304 couple to the PWM unit via the common output pin, the RGB camera 302 and the depth camera 304 receive these pulses substantially contemporaneously and, therefore, are configured to acquire respective images at substantially the same time.

In response to detecting a pulse from the PWM unit and acquiring a color image of the environment, the RGB camera 302 is configured to send this image to a corresponding RGB driver 312 via the interface 308(1). Similarly, in response to detecting the pulse from the PWM unit and acquiring a depth image of the environment, the depth sensor 304 is configured to send this depth image to a corresponding depth driver 314 via the interface 308(2). The respective drivers may process the received images and, when complete may provide these images down the pipeline, in this example to a synchronization application 316.

In addition, the computing device 306 includes an interrupt service 318. Initially, the interrupt service 318 may create an RGB timestamp queue 320 and a depth timestamp queue 322. While in this example the interrupt service 318 generates two timestamp queues, it is to be appreciated that in other instances the interrupt service 318 may generate a number of timestamp queues equal to the number of sensors for which respective data streams are being aligned. Further, the queues 320 and 322 may comprise respective data structures in respective portions of memory of the computing device, queues implemented in hardware, or a combination thereof.

After creating the queues, the interrupt service 318 is called by the processor as described above in response to an interrupt being generated based on the pulse being generated by the PWM unit. In response to being called, the interrupt service 318 determines a current time using a clock of the computing device 306 and generates a timestamp specifying the current time for each timestamp queue. That is, in this example, the interrupt service 318 generates a first timestamp specifying the current time and stores this first timestamp in the RGB timestamp queue 320. Similarly, the interrupt service 318 generates a second timestamp specifying the current time and stores this second timestamp in the depth timestamp queue 322. Because the pulse and the interrupt occur substantially simultaneously, the RGB camera 302, the depth sensor 304, and the interrupt service 318 may perform their respective operations substantially simultaneously. While the above example describes a timestamp as a current time, in other instances the timestamps may implemented as an atomically increasing count (e.g., 1, 2, 3, etc.) which may be used to align images stored in the different queues in the same manner as time-of-day indications may be used.

Further, while the above example describes a single pulse, as the PWM unit continues to generate pulses, the RGB camera 302 continues to acquire respective images, as does the depth sensor 304. Further, the interrupt service may continue to fill the queues upon receiving respective interrupts.

After the RGB driver 312 finishes a particular image, the RGB driver 312 provides this image to the synchronization application 316. Upon receiving the color image, the application 316 retrieves the first timestamp from the RGB timestamp queue 320, which operates as a FIFO queue. The synchronization application 316 then associates the first timestamp with the color image by, for example, appending the first timestamp to a header portion of the color image. Similarly, when the depth driver 314 finishes processing a particular depth image, the driver 314 may provide this image to the synchronization application 316. In response, the application 316 retrieves the second timestamp (i.e., the next-in-line timestamp in the queue) from the depth timestamp queue 322, which also operates as a FIFO queue. The synchronization application 316 then associates the second timestamp with the depth image by, for example, appending the second timestamp to a header portion of the depth image. Because the first and second timestamps specify the same time, both the color image and the depth image—captured substantially simultaneously—are not timestamped with the same time. By performing this process on subsequent images captured by the RGB camera 302 and the depth sensor 304, the synchronization application 316 aligns the video captured by these independent cameras.

In some instances, the synchronization application 316 may determine to restart the alignment process. That is, because errors may occur in the processing of the images during the image-processing pipeline, the data streams may become misaligned. In this regard, the synchronization application 316 may utilize an algorithm that determines when to restart the process based on the current state of the RGB timestamp queue 320 and the current state of the depth timestamp queue 322. For instance, this algorithm may take into account the differential between the amount of timestamps in each queue as well as the amount of time that these queues have had a differential. That is, if the queues have a same number of timestamps stored at a particular time, then the algorithm may determine that the process is healthy. If, however, the algorithm calculates that a large disparity exists in the number of stored timestamps in one queue relative to the other and/or that a differential has existed for a relatively long amount of time, then the process may be determined to need restarting. It is to be appreciated that the amount of imbalance between the queues and the amount of time may vary depending upon implementation details.

When the synchronization application 316 determines to restart the synchronization process, the synchronization application 316 may send a first instruction to the PWM unit 310 to cease generating pulses—and, hence, ceasing the sensors from capturing further data frames. The synchronization application 316 may then empty each queue (e.g., in this example the RGB and depth timestamp queues) and, thereafter, may send a second instruction to the PWM unit 310 to again begin generating pulses. Finally, while the above example illustrates and describes the components of the system in a single device, it is to be appreciated that these components may be distributed across any number of devices residing in any number of environments.

Figure 3B:
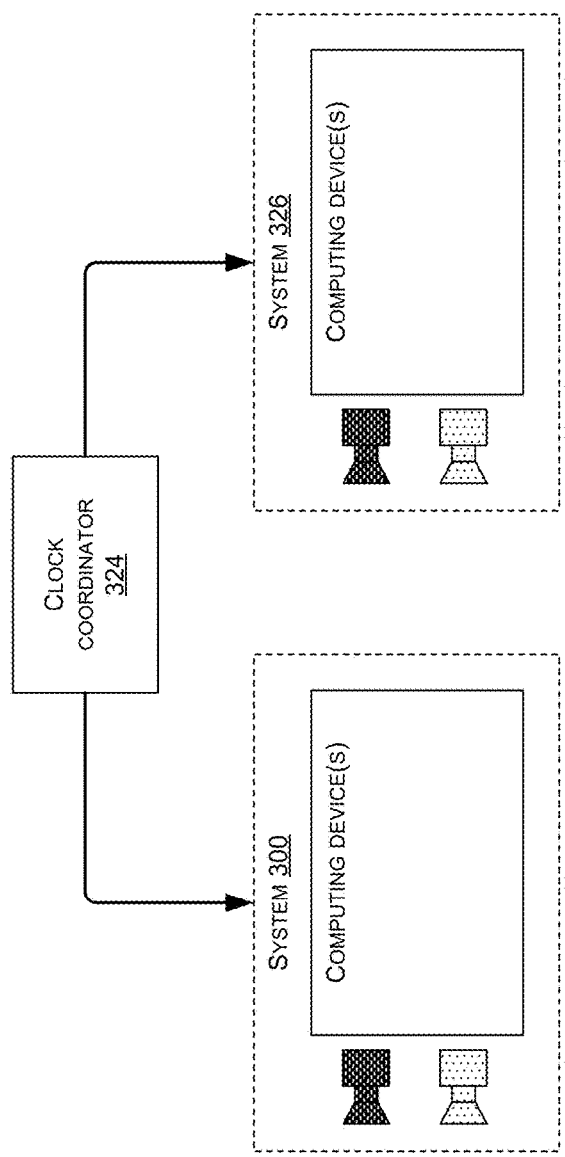
FIG. 3B illustrates an instance where multiple example systems, such as instances of the system of FIG. 3A, couple to one another via a clock coordinator that functions to align system clocks of the individual systems. By aligning the system clocks in this manner, the individual illumination units may illuminate the environment at offsetting times, thus ensuring that illumination from one system does not affect image data captured by camera(s) of another system.

FIG. 3B illustrates an instance where multiple example systems, such as instances of the system 300 of FIG. 3A, couple to one another via a clock coordinator 324 that functions to align system clocks of the individual systems. By aligning the system clocks in this manner, the individual illumination units may illuminate the environment at offsetting times, thus ensuring that illumination from one system does not affect image data captured by camera(s) of another system. While FIG. 3B illustrates two systems coupled to the clock coordinator 324, any other number of systems may be synchronized in this manner.

As illustrated, an environment, such as the facility 100, may include multiple different systems for generating data. For instance, a first system 300 may function acquire image data for a generating a first 3D model of the facility 100, while a second system 326 may function to acquire image data for generating a second 3D model of the facility 100, and so forth. In some instances, however, a sensor, such as a depth camera, may include an illumination unit that illuminates its environment at a particular periodicity corresponding to the periodicity of the depth camera for the purpose of allowing the depth camera to generate a depth map of the environment. That is, the illumination unit may illuminate the environment, such that the depth camera utilizes time-difference-of-arrival (TDOA) or other techniques for determining the varying depths of the environment. In these instances, however, the accuracy of a depth map (and, hence, a resulting 3D model) generated by a particular depth camera is jeopardized when the environment is illuminated by an illumination unit of another system. That is, if an illumination unit of a second system illuminates the environment at or near a time that the depth camera is acquiring an image of the environment, then the resulting depth map may be comprised.

Therefore, the clock coordinator 324 may function to align individual system clocks of the different systems (such as systems 300 and 326 and, potentially, additional systems), such that these systems are able to offset their activity relative to one another. That is, envision that the three system are generating respective 3D models of an environment by capturing an image every 12 milliseconds (ms). In this example, a first system may be configured to illuminate the environment and capture images of the environment at times equal to 0 ms, 12 ms, 24 ms, etc., while the second system may be configured to capture images at times equal to 4, 16, 28 ms, etc. and the third system may be configured to capture images at times equal to 8 ms, 20 ms, 32 ms, etc. That is, because the clocks of the individual systems are aligned, when the systems implement an offset relative to one another, the offset can be trusted as the clock coordinator 324 ensures that drift will not occur significantly over time. In some instances, the clock coordinator 324 may comprise one or more server computing devices configured to implement a network time protocol (NTP) for synchronizing the system clocks, or may utilize any other known protocol, process, or algorithm for synchronizing system clocks.

Figure 4:
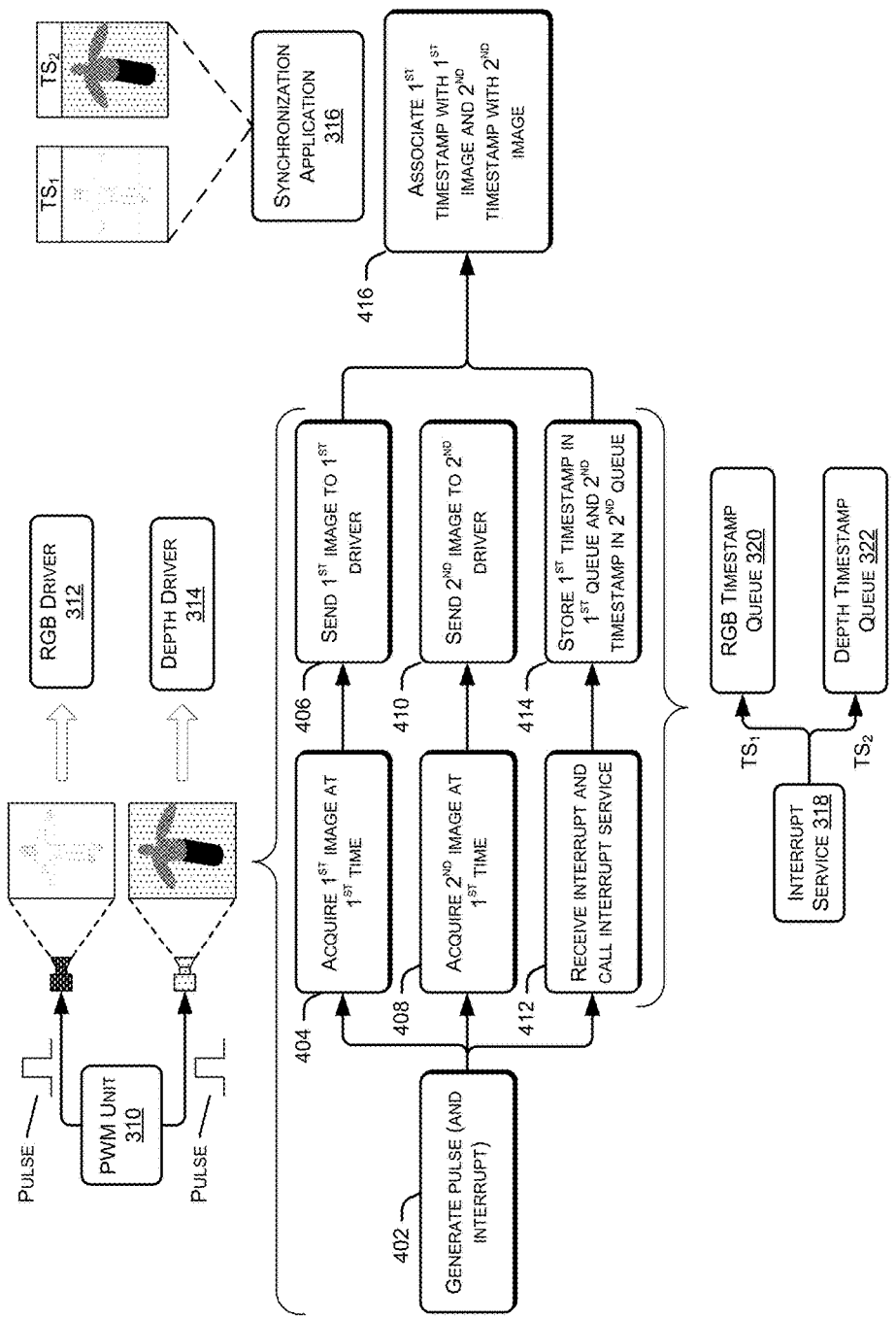
FIG. 4 illustrates a flow diagram of an example process for synchronizing images of a first camera with images of a second camera using the example system of FIG. 3A.

FIG. 4 illustrates a flow diagram of an example process 400 for synchronizing images of a first camera with images of a second camera using the example system of FIG. 3A. The process 400, and each process described herein, is illustrated as a collection of blocks in a logical flow graph, which represent a sequence of operations that can be implemented in hardware, software, or a combination thereof. In the context of software, the blocks represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 402, the PWM unit 310 generates a pulse, resulting in the generation of a corresponding interrupt that is detected by the processor. As noted above, the PWM unit couples to the example RGB sensor 302 and the example depth sensor 310 via a common line. As such, at 404 the RGB camera 302 detects the pulse and acquires a first image of the environment at a first time. At 406, the RGB camera sends this first image to its RGB driver 312. Simultaneously as the RGB camera 302 capturing the first image, at 408 the depth sensor 304 captures a second image of the environment at the first time. At 410, the depth sensor 304 sends this second image to its depth sensor 314.

Further, as the cameras are detecting the pulse, the interrupt service 318 is being called in response to the interrupt generated based on the pulse. Therefore, an operation 412 represents receiving the interrupt and calling the interrupt service 318. In response to being called, at 414 the interrupt service generates first and second timestamp queues, both specifying the same, current time corresponding to the first time, and stores the first timestamp in the RGB timestamp queue 312 and the second timestamp in the depth timestamp queue 314.

At 416, the synchronization application receives the first image and, at the same time or at a different time, receives the second image. In response to receiving the first image, the synchronization application 316 obtains the next-in-line timestamp from the RGB timestamp queue 312 (in this instance, the first timestamp). The application 316 then associates the first timestamp with the first image, such as by appending it to the header of the first image. Similarly, upon receiving the second image, the synchronization application 316 obtains the next-in-line timestamp from the depth timestamp queue 314 (in this instance, the first timestamp). The application 316 then associates the second timestamp with the second image, such as by appending it to the header of the second image. This process may repeat, thus aligning the images acquired by the RGB camera with the images acquired by the depth sensor via the accurate timestamping.

Figure 5A:
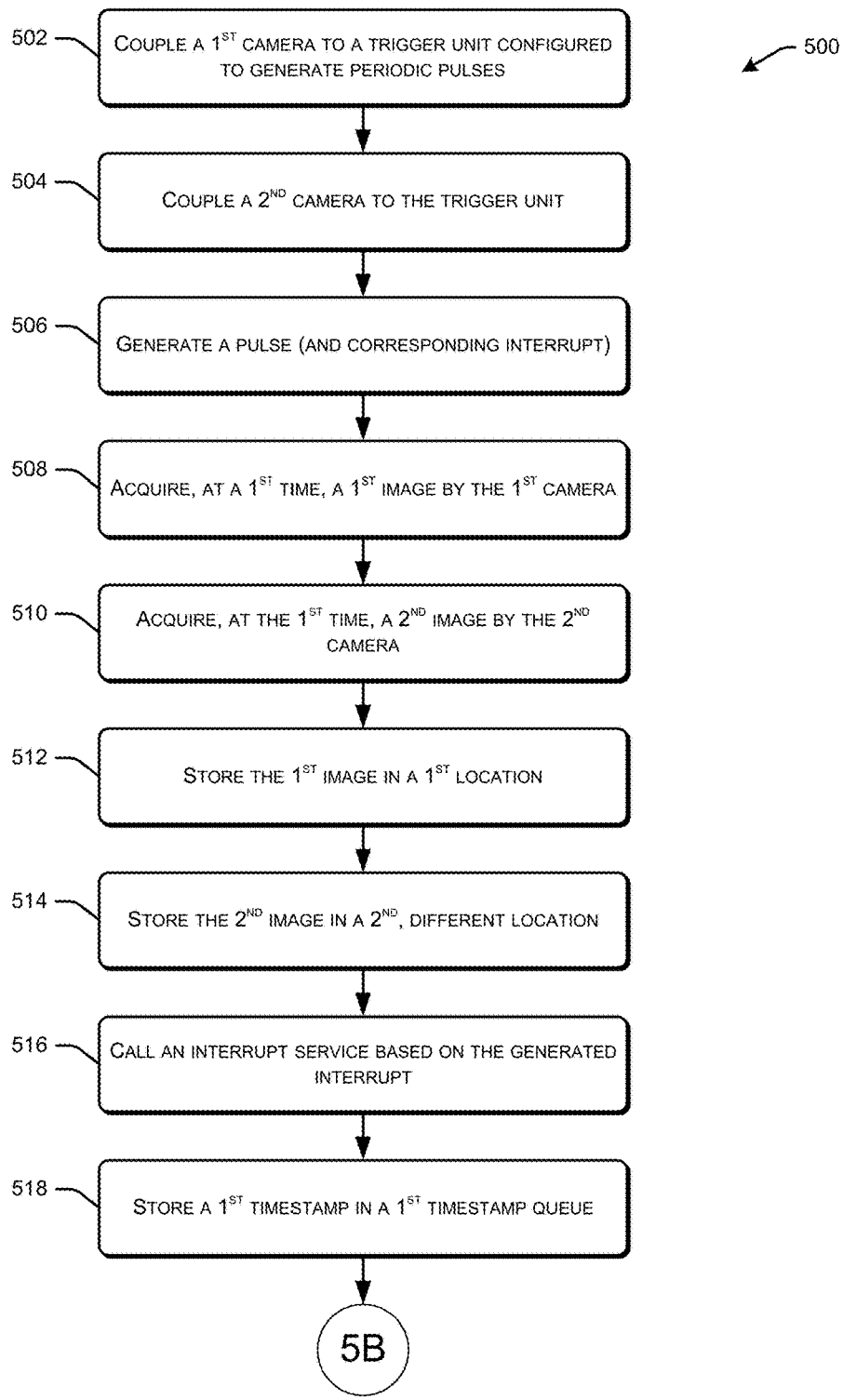
FIGS. 5A-C collectively illustrate a flow diagram of another example process for synchronizing images from of a first camera with images of a second camera. While this processes and others described herein illustrates the synchronization of data streams from two camera, in some instances the techniques may equally apply to synchronize any number of cameras. Further, the techniques may equally apply to synchronization of other types of data streams (e.g., audio data streams, data streams from weight sensors, etc.).
Figure 5B:
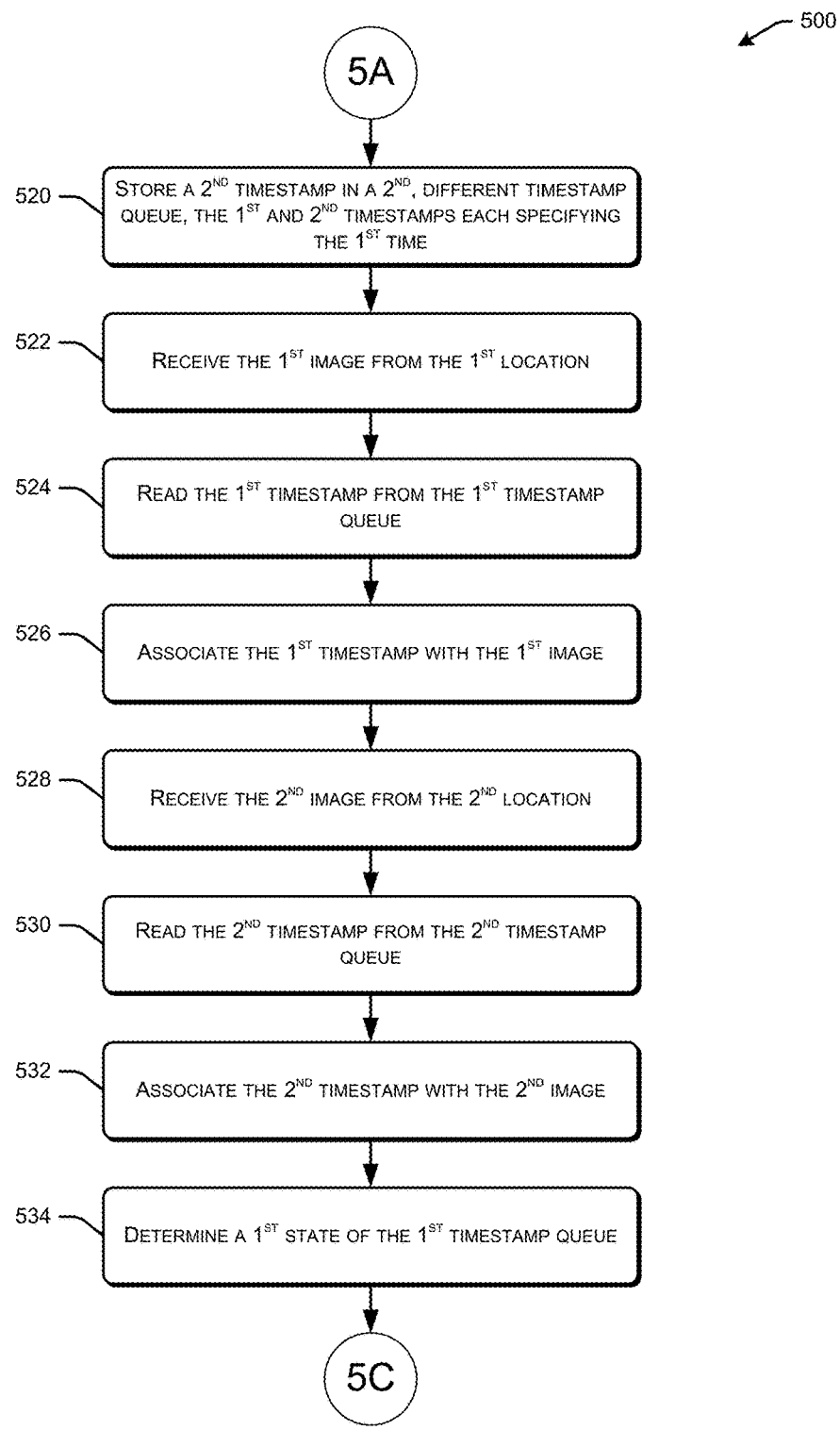
Figure 5C:
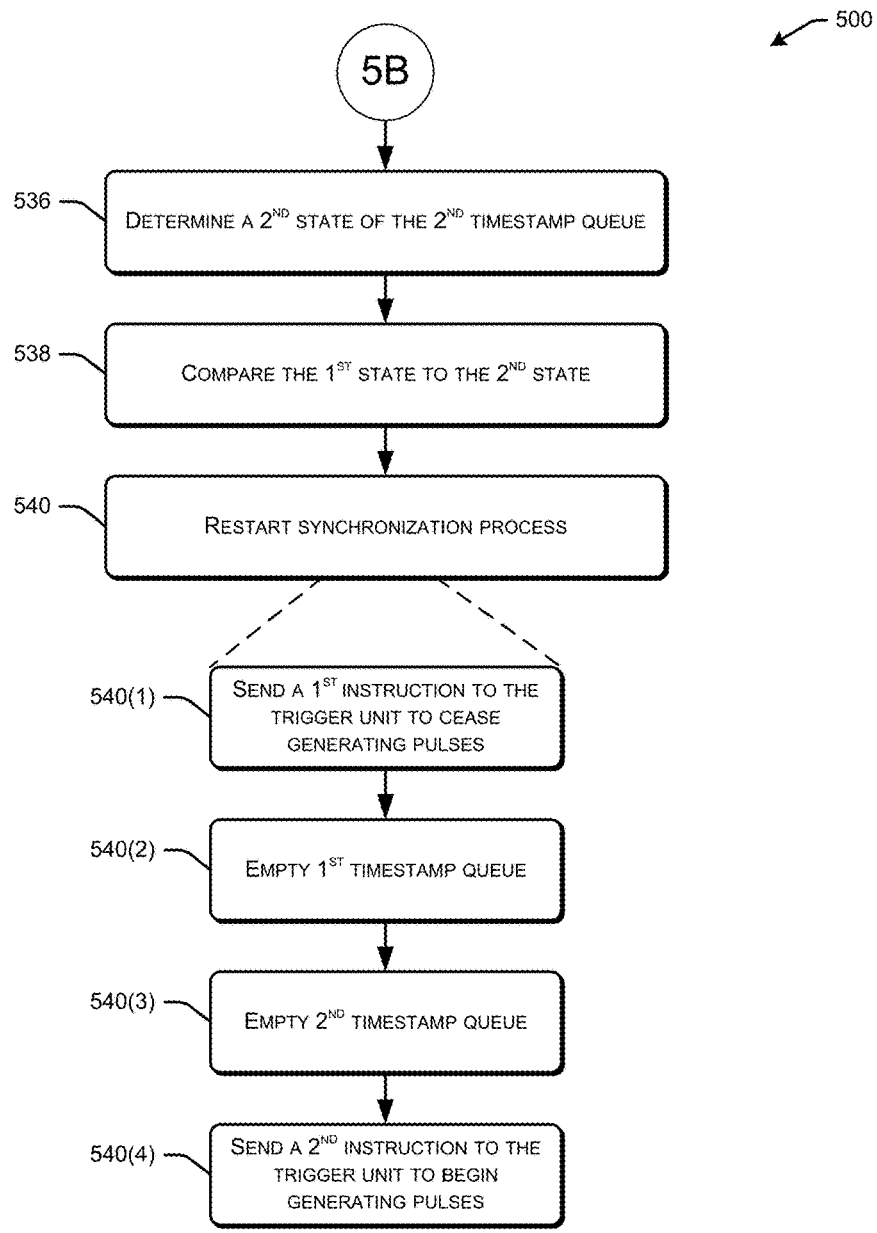

FIGS. 5A-C collectively illustrate a flow diagram of another example process 500 for synchronizing images from a first camera with images from a second camera. While this processes and others described herein illustrates the synchronization of data streams from two camera, in some instances the techniques may equally apply to synchronize any number of cameras. Further, the techniques may equally apply to synchronization of other types of data streams (e.g., audio data streams, data streams from weight sensors, etc.).

At 502, a first camera is coupled to a trigger unit (e.g., a PWM unit) that is configured to generate periodic pulses. At 504, a second camera is coupled to the trigger unit, potentially via a common communication channel (e.g., to the same output pin of a PWM unit) as the first camera such that both cameras receive the pulses generated by the trigger unit substantially simultaneously. At 506, the trigger unit generates a first pulse, resulting in the generation of a corresponding first interrupt that is sent to and received by the processor. At 508, in response to detecting the first pulse, the first camera captures a first image at a first time. Similarly, at 510, in response to detecting the first pulse, the second camera captures a second image at the first time.

At 512, the first image is stored at a first location, such as location associated with a particular driver of the first camera. At 514, the second image is stored at a second, different location, such as a location associated with a particular, different driver of the second camera. At 516, in response to detecting the interrupt generated by the trigger unit, the processor invokes the interrupt service. Upon invocation, at 518 the interrupt service stores a first timestamp, specifying the first time, in a first timestamp queue.

FIG. 5B continues the illustration of the process 500 and includes, at 520, the interrupt service storing a second timestamp, specifying the first time, in a second, different timestamp queue. At 522, a synchronization application receives the first image from the first location, potentially after the first driver has finished processing this image. At 524, and in response, the application reads the first timestamp data from the first timestamp queue and, at 526, associates the first timestamp specifying the first time with the first image. As described above, the application may read, from the first timestamp queue, the least-recent timestamp—that is, the timestamp that was first placed in the queue. At 528, the synchronization application receives the second image from the second location, potentially after the second driver has finished processing this image. At 530, and in response, the application reads the second timestamp data from the second timestamp queue and, at 532, associates the second timestamp specifying the first time with the second image. As described above, the application may read, from the second timestamp queue, the least-recent timestamp—that is, the timestamp that was first placed in the second queue.

At 534, meanwhile, the synchronization application may determine a first state of the first timestamp queue. This may include determining a current number of timestamps currently stored in the queue, potentially along with the respective times associated with these timestamps.

FIG. 5C concludes the illustration of the process 500 and includes, at 536, determining a second state of the second timestamp queue. Again, this may include determining a current number of timestamps currently stored in the queue, potentially along with the respective times associated with these timestamps. At 538, the application compares the first state to the second state to determine whether the synchronization process should be restarted. In some instances, the application determines whether or not to restart the process periodically or in response to a particular trigger. In this particular example, the synchronization application determines at 540 that the process should be restarted. In some instances, restarting the process may include sub-operations 540(1)-(4). At 540(1), the applications sends a first instruction to the trigger unit to cease generating pulses. At 540(2), the application empties the first timestamp queue and, at 540(3), empties the second timestamp queue. That is, the application may delete any contents of these queues stored in memory. Finally, at 540(4), the synchronization application may send a second instruction to the trigger unit, instructing the trigger unit to begin generating pulses.

Figure 6:
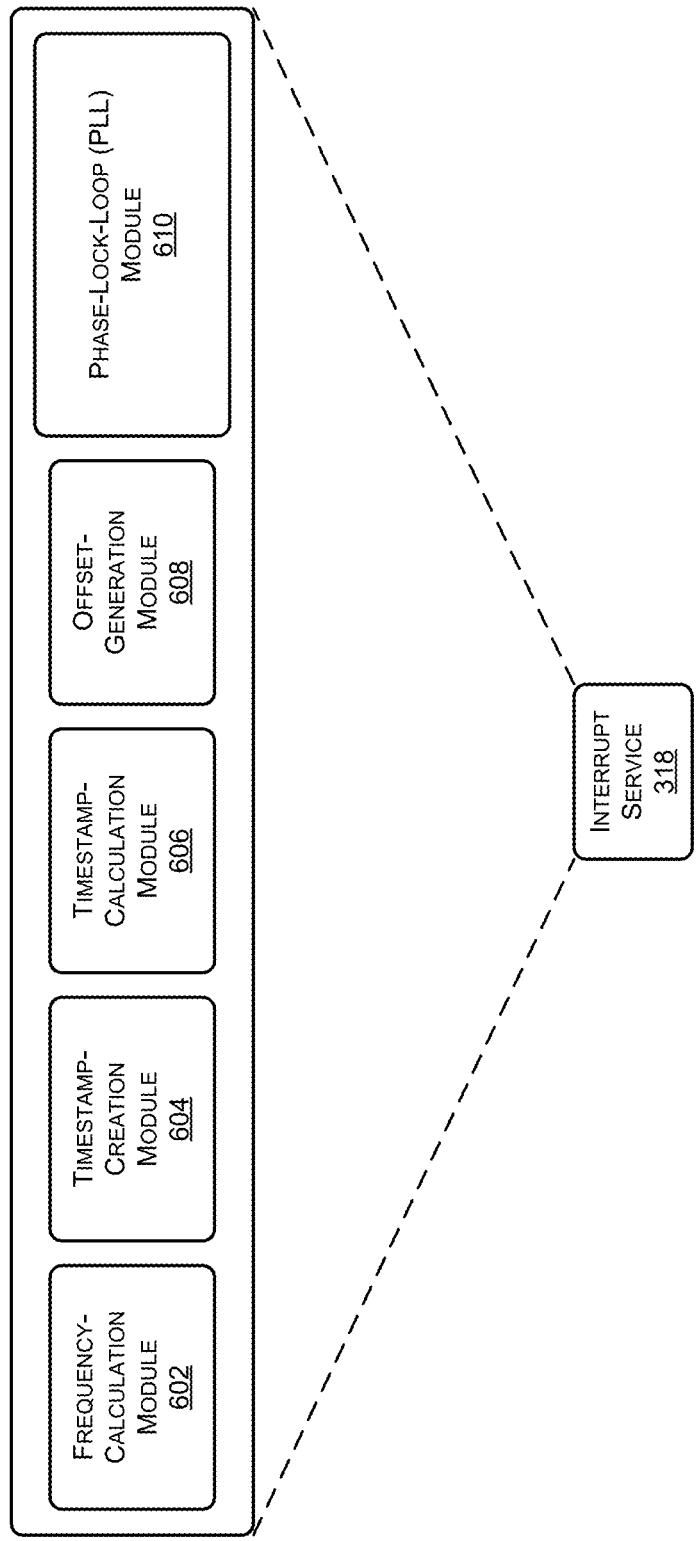
FIG. 6 illustrates example components of the interrupt service of FIGS. 1 and 3A. As illustrated, the interrupt service may include a phase-loop-lock (PLL) module that adjusts the frequency at which pulses are generated by a trigger unit, to increase alignment between corresponding sensor data.

FIG. 6 illustrates example components of the interrupt service of FIGS. 1 and 3A. As described in detail below, the interrupt service 318 may adjust the frequency at which the pulses are generated by the PWM unit in order to account for drift that occurs in the system. That is, the interrupt service 318 may adjust the nominal frequency slightly after each pulse is generated to account for error by the expected time of the previous pulse(s) and the actual time of the previous pulse(s).

As illustrated, the interrupt service 318 includes a frequency-calculation module 602, a timestamp-creation module 604, a timestamp-calculation module 606, an offset-generation module 608, a phase-loop-lock (PLL) module 610. Generally, the frequency-calculation module 602 may determine how to set the frequency at which PWM unit generates the pulses for acquiring the sensor data. For instance, the frequency-calculation module 602 writes an integer value to a register of the PWM unit, with the integer value corresponding to the nominal frequency at which the PWM unit is to generate the pulses. The frequency-calculation module 602 may then periodically slightly adjust this nominal frequency based on the actual error that occurs between the expected and actual timing of the pulses. That is, the frequency-calculation module 602 may periodically update the value of the integer in the register to correspond to a frequency that is slightly different than the nominal frequency to account for the error.

The timestamp-creation module 604 detects the pulses generated by the PWM unit and generates corresponding timestamps. That is, the timestamp-creation module 604 generates recorded timestamps corresponding to the actual time of the pulses (i.e., within some margin of error of the actual time of the generated pulses). Given the existence of some amount of latency in the system, the recorded timestamps often differ very slightly from the values of the expected timestamps. In some instances, the timestamp-creation module 604 writes the values of the recorded timestamps to one or more timestamp queues, such as the queues discussed above with reference to FIG. 3A.

The timestamp-calculation module 606, meanwhile, calculates the values of the expected timestamps. Stated otherwise, the timestamp-calculation module 606 determines the values of the ideal timestamps of the system based on the nominal frequency, if no error were present in the system. If, for example, the PWM unit is set to generate pulses every 33 ms, the timestamp-calculation module 606 may calculate values of expected timestamps equal to multiples of exactly 33 ms. In some instances, the timestamp-calculation module 606—rather than the timestamp-generation values-writes the values of these expected timestamps to one or more timestamp queues, such as the queues discussed above with reference to FIG. 3A.

The offset-generation module 608 may, in some instances, inject an offset into the system for purposes of staggering data acquisition between systems, such as the systems shown in FIG. 3B. As discussed above, in some instances two or more units or systems may generate depth maps of the environment using respective depth cameras. In these instances, the depth cameras may each utilize a respective illumination unit that illuminates the environment. The depth sensor then acquires respective images of the environment when its respective illumination unit is active, and the may utilize TDOA or other techniques for generating depth values of the depth map. Staggering illumination of the environment by the different illumination units may avoid oversaturation of the environment with light (by multiple illumination units illuminating the environment) and, thus, avoid inaccurate depth map calculations. Therefore, if, for example, PWM units of three systems are configured to generate pulses ever 33 ms, a first of the systems may operate without an offset, a second of the systems may operate with a 3 ms offset (or other value), and a third of the systems may operate at a 6 ms offset (or other value). In these instances, if the clocks began generating pulses at a time of "0", the first system may expect timestamps at 0 ms, 33 ms, 66 ms, etc., the second at 3 ms, 36 ms, 69 ms, and the third at 6 ms, 39 ms, and 72 ms. In these instances, the offset-generation module 608 may inject this offset into the system. As described above, in some instances, the clock-coordinator 324 may calculate these offsets and provides values of the offsets to the respective offset-generation modules of the systems.

Finally, the PLL module 610 may determine how to adjust the frequency at which pulses are generated by a trigger unit, to increase alignment between corresponding sensor data. That is, the PLL module 610 may compare the expected timestamp values with the actual record timestamp values. In some instances, as described below, the PLL module 610 determines a total error during each loop (or any other periodicity) based on both the value of the error of the current loop (the proportional error) and the value of the error of the sum of each previous loop (the integral loop). The PLL module 610 may then provide an indication of the error to the frequency-calculation module 602, which may adjust the value of the integer written in the PWM register based on the error. It is to be appreciated that, as used herein, an "error" may represent a number, an amount of time, an indication that two items do not match (e.g., timestamps), or any other indication of a result that is different than another result, an expected result, an actual or ideal result, or the like.

Figure 7:
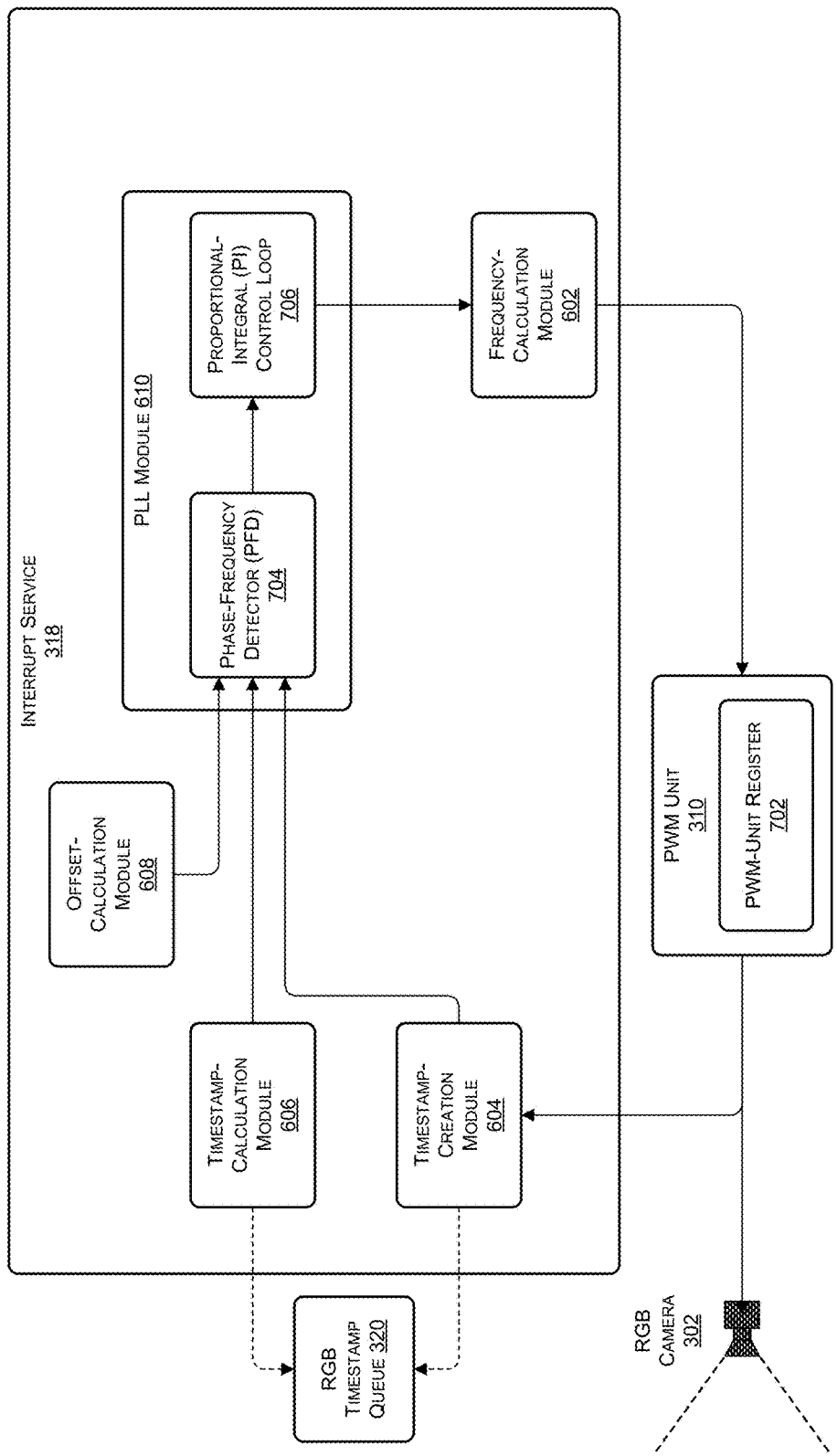
FIG. 7 illustrates the example components of the interrupt service in greater detail. As illustrated, the interrupt service includes a frequency-calculation module that adjusts a frequency at which the illustrated PWM unit generates pulses to the camera, based on an amount calculated by the PLL module.

FIG. 7 illustrates the example components of the interrupt service 318 in greater detail. In this example, the PWM unit 310 generates pulses that are detected by both the interrupt service 318 and the RGB camera 302. Of course, while FIG. 7 illustrates one example sensor, it is to be appreciated that any other number and type of sensor may couple to the PWM unit 310 to acquire respective data in response to detecting respective pulses.

As illustrated, the PWM unit 310 includes a register 702 to which values for operating the PWM unit 310 at different frequencies may be generated. Initially, the frequency-calculation module 602 may write a value corresponding to a nominal frequency to the PWM-unit register 702. The PWM unit 310 may then read the value from the register and generate a first pulse at a time corresponding to the nominal frequency. Upon detecting the pulse, the RGB camera 302 may acquire an image of the environment. In addition, the timestamp-creation service 604 may detect the pulse and may generate a first recorded timestamp corresponding to an actual time at which the pulse was received. The timestamp-calculation module 606, meanwhile, may generate a first expected timestamp, which may represent the ideal time at which the first timestamp would have been generated if the system did not include any drift or other error. In some instances, the recorded timestamps differ from the expected timestamps by relatively small amounts, once the system has looped through the process multiple times, thus allowing the system to slowly reach equilibrium with regards to timestamp synchronization.

As illustrated, in some instances the timestamp-creation module 604 writes the value of the recorded (i.e., actual) timestamp in the sensor queue, in this instance the RGB timestamp queue 320. In other instances, however, the timestamp-calculation module 606 writes the value of the expected (i.e., ideal) timestamp in the queue instead. In either instance, the timestamp-creation module 604 provides the value of the first (and subsequent) recorded timestamp to a phase-frequency detector (PFD) 704 of the PLL module 610, while the timestamp-calculation module 606 may provide the value of the first (and subsequent) expected timestamp to the PFD 704. In addition, if this particular system is implementing an offset, then the offset-calculation module 608 may provide the value of the offset to the PFD 704.

The PFD 704 functions to determine a difference between the value of the recorded timestamp and the value of the expected timestamp (potentially summed with the value of the offset, if any). The PFD 704 then provides the value of the resulting difference to a proportional-integral (PI) control loop 706. The PI control loop 706 then uses this error (i.e., difference between the expected and recorded timestamp) at least in part to determine a total error, which in turn is used to determine how much to adjust the nominal frequency for a subsequent pulse generated by the PWM unit 310.

In this example, the PI control loop 706 determines the total error ($P_t$) as a sum of a proportional error ($P_e$) and an integral error ($P_i$). The proportional error may represent an error between the actual timestamp and the expected timestamp for the current loop—that is, for the timestamps generated based on the immediately preceding (i.e., most recent) pulse from the PWM unit 310. The integral error, meanwhile, may represent the cumulative error from each preceding loop through the feedback loop. In some instances, the PI control loop 706 applies a first gain to the proportional error to generate a weighted proportional error and applies a second gain (which may or may not differ from the first gain) to the integral error to generate a weighted integral error. The PI control loop 706 may then sum these values to generate the total error.

In some instances, the PI control loop 706 may then compare the total error to a maximum error to determine whether the total error exceeds the maximum error. Stated differently, the PI control loop 706 (or the frequency-calculation module 602) may determine whether a frequency adjustment corresponding to the total error would exceed a maximum frequency adjustment. If not, then the frequency adjustment corresponding to the total error may be implemented. That is, the PI control loop 706 may provide an indication of the total error—or an indication of the corresponding frequency adjustment—to the frequency-calculation module 602, which may write a new value to the register 702 to adjust the nominal frequency at which the PWM unit 310 generates a subsequent pulse. If, however, the adjustment corresponding to the total error exceeds the maximum adjustment, then the frequency-calculation module 602 may adjust the nominal frequency by the maximum amount to avoid continual overcorrection. That is, by capping the adjustment made on each loop through the feedback loop, the system may ensure that large swings do not occur on each loop. As such, as the system continues to loop through the feedback loop, the error may become smaller and smaller and, therefore, the adjustments may as well.

After the frequency-calculation module 602 writes a new value to the register 702, the PWM unit 310 may generate a second pulse at a time corresponding to adjusted frequency. Again, the RGB camera may acquire second data upon detecting the second pulse, while the timestamp-creation module 604 may generate a second recorded timestamp and the timestamp-calculation module 606 may generate a second expected timestamp. At least one of these values may be written to the queue, and both values (potentially along with an offset) may be provided to the PFD 704 of the PLL module 610. The PFD may determine a difference between the second recorded timestamp and the second expected timestamp (potentially summed with the offset) and may provide the value of this difference to the PI control loop 706. The PI control loop 706 may then determine a proportional error based on this difference, and may determine an integral error based on this difference and preceding errors (in this example, as a sum of the difference between error of the first and the error of the current, second loop). The PI control loop 706 may then apply respective weights to the proportional and integral errors and may sum the resulting weighted values to generate a total error. The PI control loop 706 may then provide an indication of this total error (or a corresponding frequency adjustment, if converted) to the frequency-calculation module 602, which may adjust the frequency by the lesser of the maximum adjustment or the adjustment corresponding to the total error. This process may repeat for subsequent loops and pulses, as the reader will appreciate.

Figure 8:
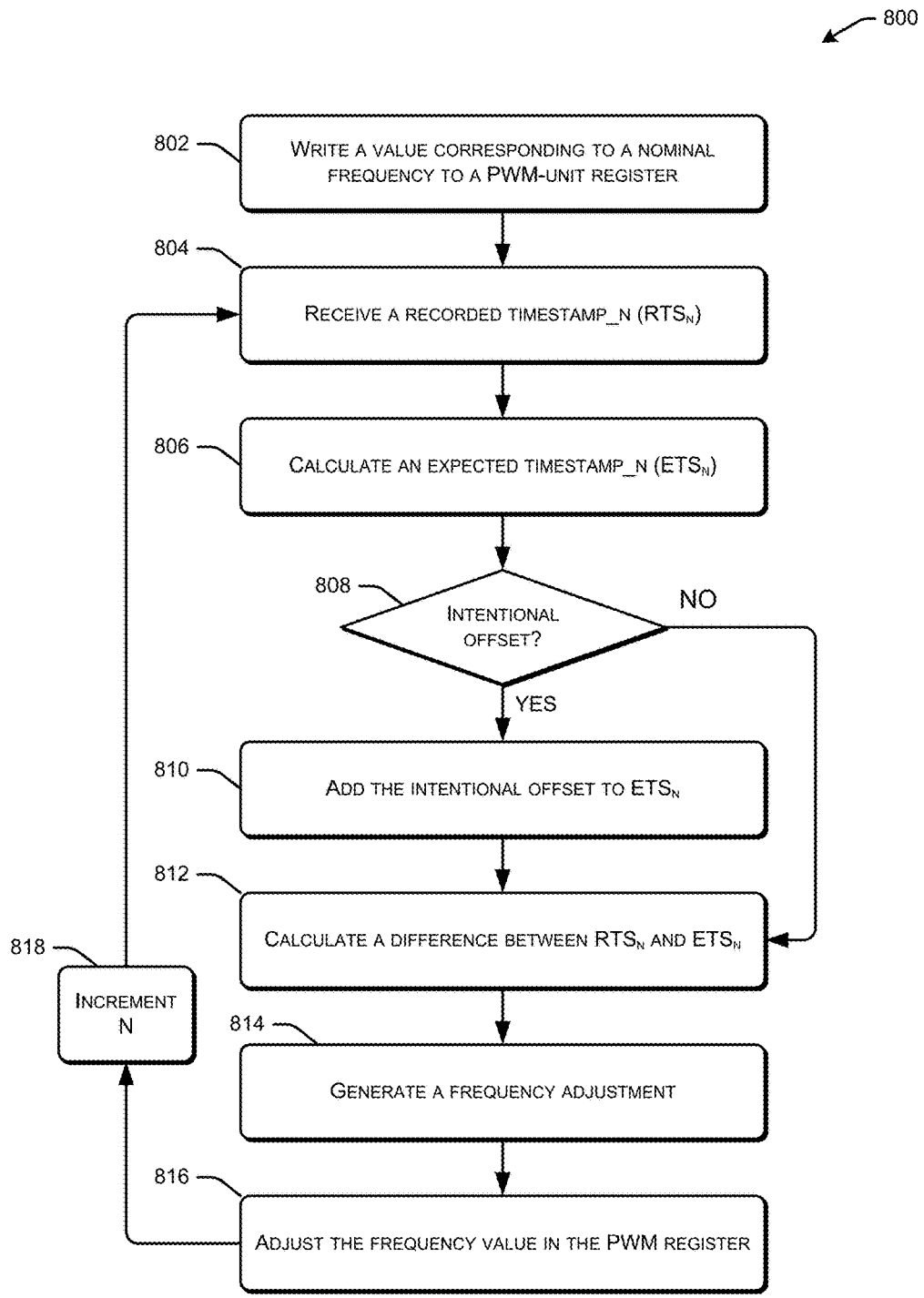
FIG. 8 illustrates an example process of continually or periodically adjusting a frequency at which a trigger unit generates pulses.

FIG. 8 illustrates an example process 800 of continually or periodically adjusting a frequency at which a trigger unit, such as a PWM unit, generates pulses. At 802, the frequency-calculation module 602 writes a value corresponding to a nominal frequency to a register, such as a PWM-unit register. At 804, the PLL module 610 receives a recorded timestamp$_n$ (RTS$_n$). At 806, the timestamp-calculation module 606 calculates an expected timestamp$_n$ (ETS$_n$). At 808, the PLL module 610 determines whether it has received an intentional offset. If so, then the PLL module 610 adds the value of the intentional offset to ETS$_n$. If not, or after adding the offset, the process 800 proceeds to 812, at which time the PLL module 610 calculates a difference between ETS$_n$ (potentially as adjusted by the offset) and RTS$_n$.

At 814, the PLL module 610 or the frequency-calculation module 602 generates a frequency adjustment. As discussed with reference to FIG. 9, this may include generating a frequency adjustment corresponding to a lesser of a value corresponding to an error determined at least in part from the comparison of 812 or a maximum value. At 816, the frequency-calculation module 602 adjusts the frequency value in the register, such as the PWM-unit register. That is, the module 602 may write, in the register, a new value that differs from the previous written value corresponding to the nominal frequency. Thus, given that the trigger unit may read the register to determine the frequency at which to generate subsequent pulses, the module 602 may effectively adjust the nominal frequency by writing this new value to the register. At 818, the process 800 increments "n" and the process 800 loops back to 804 for a subsequent pulse.

Figure 9:
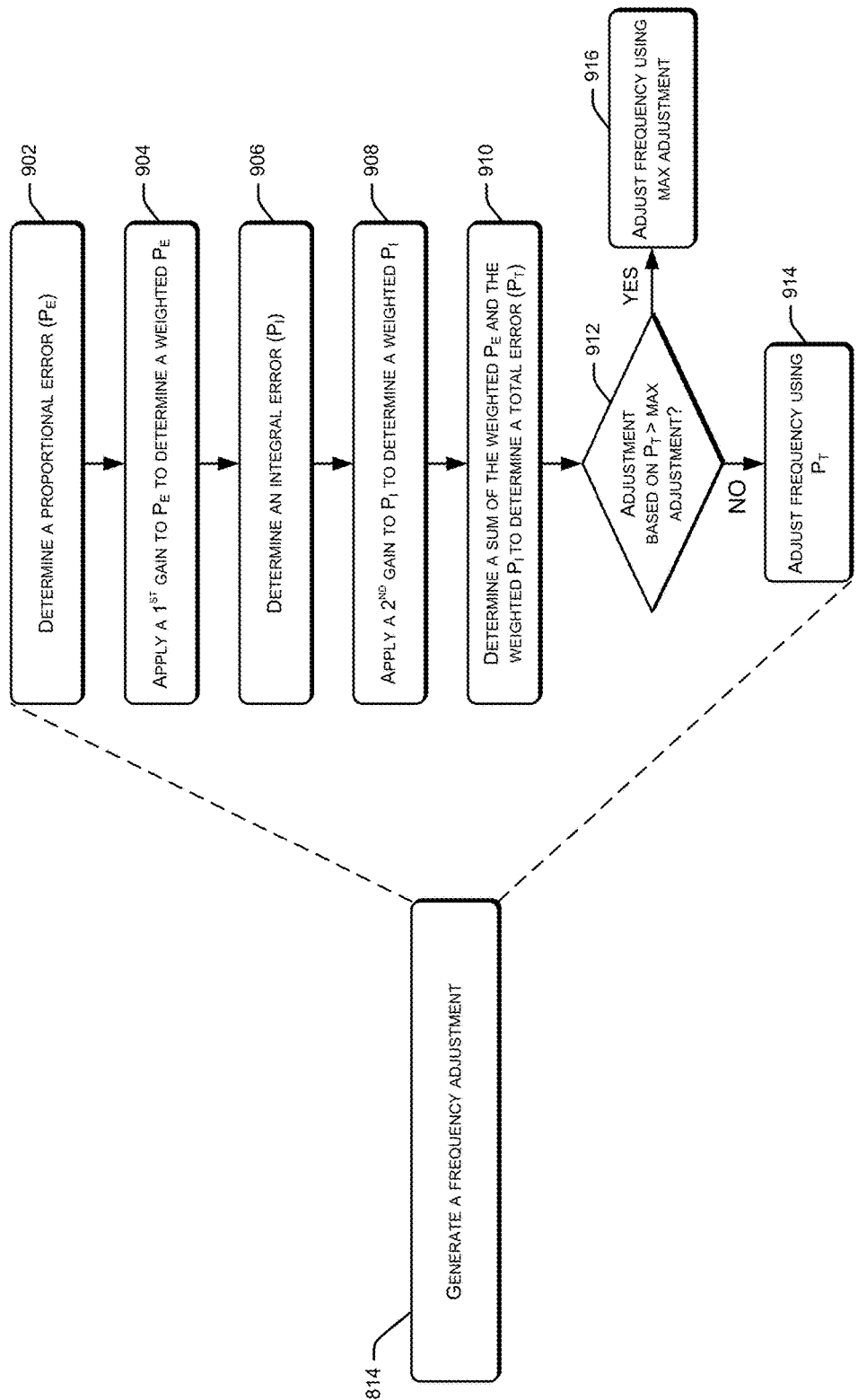
FIG. 9 illustrates an example process for generating a frequency adjustment, including determining an amount by which to adjust the frequency.

FIG. 9 illustrates an example process 900 for generating a frequency adjustment, including determining an amount by which to adjust the frequency. The process 900 may be performed by the PLL module 610, the frequency-calculation module 602, other modules, or combinations thereof. At 902, the process 900 determines a proportional error which, in some instances, is based on an error between an expected and a recorded timestamp that correspond to a most-recently generated pulse. At 904, the process 900 applies a first gain to the proportional error to generate a weighted proportional error. The reader will appreciate that the amount of the first gain (and subsequently discussed second gain) may be selected based on requirements of a particular system and other factors, such as how quickly the system should converge to equilibrium, how much to rely on a current error as opposed to past errors, and the like.

At 906, the process 900 determines an integral error. As described above, the integral error may represent the cumulative error from each prior proportional error. At 908, the process applies a second gain to the integral error to generate a weighted integral error. At 910, the process sums the weighted proportional error and the weighted integral error to generate a total error. At 912, the process 900 determines whether a frequency adjustment corresponding to the total error would exceed a maximum frequency adjustment. If not, then at 914 the process 900 adjusts the frequency in an amount corresponding to the total error. If this adjustment would exceed the maximum, however, then at 916 the process adjusts the frequency using the maximum adjustment.

Figure 10:
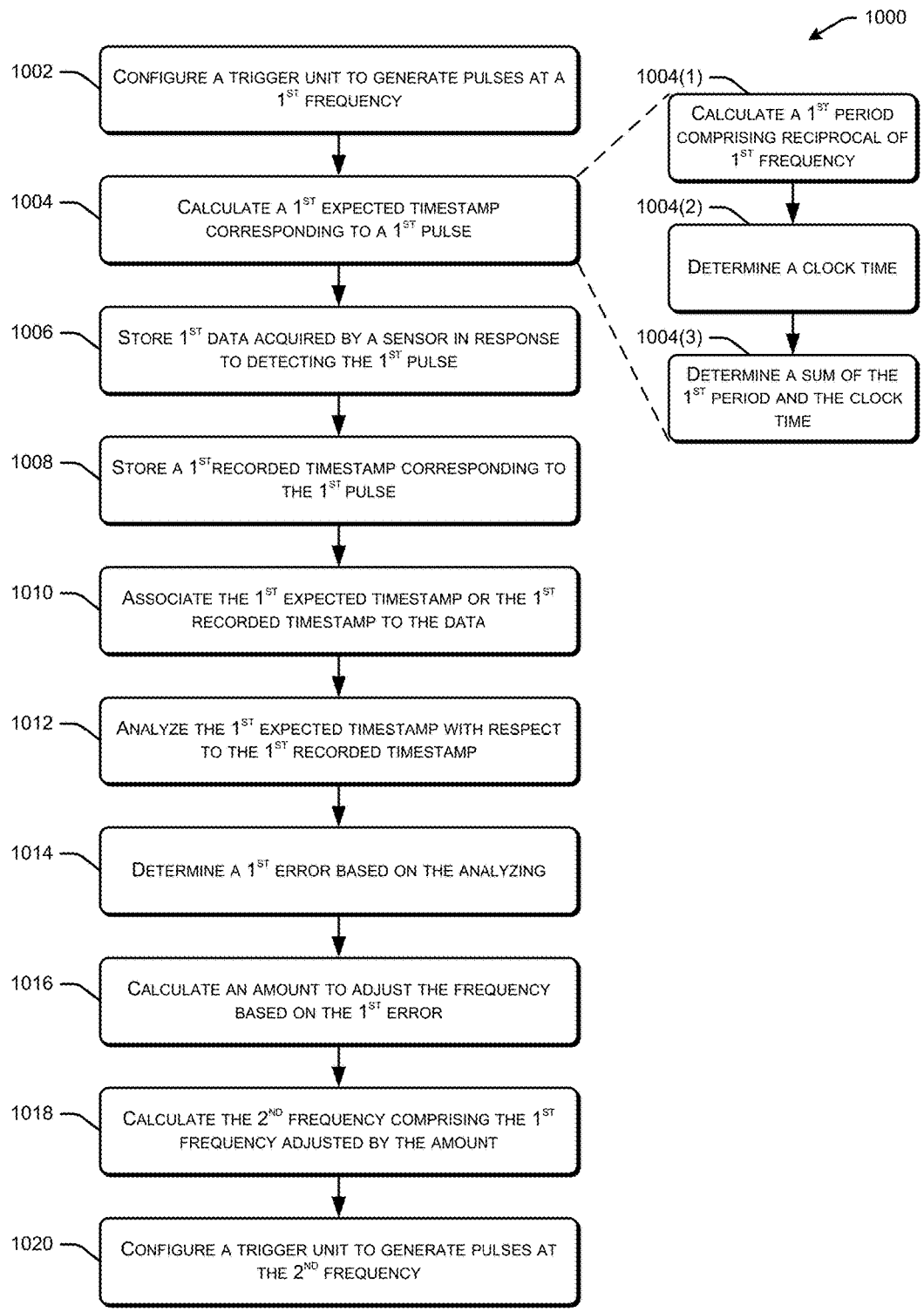
FIG. 10 illustrates another example process for adjusting a frequency at which a trigger unit generates pulses.

FIG. 10 illustrates another example process 1000 for adjusting a frequency at which a trigger unit generates pulses. At 1002, the process 1000 configures a trigger unit to generate pulses at a first frequency. This may include writing a value corresponding to the first frequency to a register that the trigger unit reads. At 1004, the process 1000 calculates a first expected timestamp corresponding to a first pulse. In some instances, this operation may include sub-operations 1004(1)-(3). At 1004(1), the process 1000 calculates a first period comprising a reciprocal of the first frequency. At 1004(2), the process 1000 may determine a current clock time of the system and, at 1004(3), may determine a sum of the first period and the current clock time. In other instances, meanwhile, each system may be configured to generate expected timestamps in other ways that are consistent across multiple systems. For instance, each system may be configured to round its system clock to the nearest 100 ms value and then add the period corresponding to the first (nominal) frequency to this value to generate the expected timestamps. In other instances, the clock coordinator 324 may instruct each system a time at which to begin calculating expected timestamps. In each of these instances, each system may calculate a first and subsequent timestamps in a consistent, known manner.

At 1006, the process 1000 stores first data acquired by a sensor in response to receiving the first pulse from the trigger unit. This sensor data may comprise any of the data acquired by any of the sensors described herein or otherwise. At 1008, the process 1000 stores a first recorded timestamp corresponding to the first pulse. That is, the process 1000 may store the value of the timestamp corresponding to the time that the pulse was actually generated (or detected by the system). At 1010, the process 1000 associates at least one of the first expected timestamp or the first recorded timestamp with the sensor data. For instance, the synchronization application discussed above may pull one of these values from the queue and append the timestamp as metadata of the sensor data.

At 1012, the process 1000 analyzes the first expected timestamp (potentially summed with an offset) with the first recorded timestamp. For instance, the process 1000 may determine a difference between these values. At 1014, the process 1000 determines a first error based on this analyzing. At 1016, the process 1000 calculates an amount to adjust the first frequency based at least in part on this error (and, potentially, based on subsequent calculated errors). At 1018, the process calculates the second frequency comprising the first frequency adjusted by the calculated amount (or by a maximum amount in some instances). At 1020, the process

1000 configures a trigger unit to generate one or more subsequent pulses at the second frequency. In some instances, this includes writing a new value to the register read by the trigger unit, as described above.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    a pulse-width-modulation (PWM) unit configured to generate pulses;
    a camera, coupled to the PWM unit and configured to acquire respective images of an environment in response to detecting respective pulses generated by the PWM unit;
    one or more processors; and
    one or more computer-readable media storing computer-executable instructions that, when executed on the one or more processors, cause the one or more processors to perform acts comprising:
        determining a nominal frequency at which to operate the PWM unit;
        calculating a value of a first expected timestamp based at least in part on the nominal frequency and a current time;
        calculating a value of a second expected timestamp based at least in part on the nominal frequency and at least one of the first expected timestamp or the current time;
        configuring the PWM unit to generate pulses at the nominal frequency;
        receiving a value of a first recorded timestamp, the value of the first recorded timestamp corresponding to a first time at which a first pulse was generated by the PWM unit;
        comparing the value of the first expected timestamp to the value of the first recorded timestamp to generate a first error;
        calculating a first amount to adjust the nominal frequency based at least in part on the first error;
        configuring the PWM unit to generate pulses at a first adjusted frequency, the first adjusted frequency comprising the nominal frequency adjusted by the first amount;
        receiving a value of a second recorded timestamp, the value of the second recorded timestamp corresponding to a second time at which a second pulse was generated by PWM unit;
        comparing the value of the second expected timestamp to the value of the second recorded timestamp to generate a second error;
        calculating a second amount to adjust nominal frequency based at least in part on the second error; and
        configuring the PWM unit to generate pulses at a second adjusted frequency, the second adjusted frequency comprising the nominal frequency adjusted by the second amount.

2. The system as recited in claim 1, the acts further comprising:
    storing at least one of the value of the first recorded timestamp or the value of the first expected timestamp in a timestamp queue;
    storing at least one of the value of the second recorded timestamp or the value of the second expected timestamp in the timestamp queue;
    receiving a first image of the environment acquired by the camera;
    receiving a second image of the environment acquired by the camera;
    reading the at least one of the value of the first recorded timestamp or the value of the first expected timestamp from the timestamp queue;
    reading the at least one of the value of the second recorded timestamp or the value of the second expected timestamp from the timestamp queue;
    adding, to the first image, metadata based on the at least one of the value of the first recorded timestamp or the value of the first expected timestamp; and
    adding, to the second image, metadata based on the at least one of the value of the second recorded timestamp or the value of the second expected timestamp.

3. The system as recited in claim 1, wherein:
    the calculating the second amount to adjust the nominal frequency comprises calculating the second amount by summing:
        a first gain applied to a difference between the value of the second expected timestamp and the value of the second recorded timestamp; and
        a second gain applied to a sum of: (i) the difference between the value of the second expected timestamp and the value of the second recorded timestamp, and (ii) a difference between the value of the first expected timestamp and the value of the first recorded timestamp.

4. The system as recited in claim 1, the acts further comprising:
    calculating a value of a third expected timestamp;
    receiving a value of a third recorded timestamp, the value of the third recorded timestamp corresponding to a third time at which a third pulse was generated by PWM unit;
    storing a value of an intentional offset, the value of the intentional offset comprising an amount of time to delay acquisition of one or more images by the camera;
    comparing: (i) a sum of the value of the third expected timestamp and the value of the intentional offset to (ii) the value of the third recorded timestamp to generate a third error;
    calculating a third amount to adjust the nominal frequency based at least in part on the third error; and
    configuring the PWM unit to generate pulses at a third adjusted frequency, the third adjusted frequency comprising the nominal frequency adjusted by the third amount.

5. A method comprising:
    configuring a trigger unit to generate pulses at a first frequency;
    calculating a first expected timestamp based at least in part on the first frequency;
    storing first data acquired by a sensor, the sensor acquiring the first data in response to receiving a first pulse;
    storing a first recorded timestamp corresponding to a first time at which the first pulse was generated;
    associating at least one of the first recorded timestamp or the first expected timestamp with the first data;
    analyzing the first recorded timestamp with respect to at least the first expected timestamp;
    determining a first error based at least in part on the analyzing; and configuring the trigger unit to generate pulses at a second frequency based at least in part on the first frequency and the first error.

6. The method as recited in claim 5, wherein:
configuring the trigger unit to generate pulses at the first frequency comprises writing a first value corresponding to the first frequency to a register of a pulse-width-modulation (PWM) unit; and
configuring the trigger unit to generate pulses at the second frequency comprises writing a second value corresponding to the second frequency to the register of the PWM unit.

7. The method as recited in claim 5, further comprising:
calculating a first period, the first period based at least in part on the first frequency; and
determining a time indicated by a clock of a computing device coupled to the trigger unit;
and wherein the calculating the first expected timestamp is based at least in part on the first period and the time indicated by the clock.

8. The method as recited in claim 5, further comprising:
calculating an amount to adjust the first frequency based at least in part on the first error; and
calculating the second frequency, the second frequency comprising the first frequency adjusted by the amount.

9. The method as recited in claim 5, wherein:
the analyzing comprises comparing the first recorded timestamp to a sum of a time indicated by the first expected timestamp and a time indicated by an intentional offset;
the determining the first error comprises determining a difference between the first recorded timestamp and the sum;
and the method further comprises:
calculating an amount to adjust the first frequency based at least in part on the first error; and
calculating the second frequency, the second frequency comprising the first frequency adjusted by the amount.

10. The method as recited in claim 5, further comprising:
calculating a second expected timestamp;
storing second data acquired by the sensor, the sensor acquiring the second data in response to receiving a second pulse;
storing a second recorded timestamp corresponding to a second time at which the second pulse was generated;
associating at least one of the second recorded timestamp or the second expected timestamp with the second data;
analyzing the second recorded timestamp with respect to at least the second expected timestamp;
determining a second error based at least in part on the analyzing of the second recorded timestamp with respect to at least the second expected timestamp; and
configuring the trigger unit to generate pulses at a third frequency based at least in part on the first frequency and the second error.

11. The method as recited in claim 10, further comprising:
calculating an amount to adjust the first frequency based at least in part on the second error; and
calculating the third frequency, the third frequency comprising the first frequency adjusted by the amount.

12. The method as recited in claim 11, wherein the calculating the amount to adjust the first frequency comprises:
calculating a proportional error ($P_E$) based at least in part on the second error;

calculating an integral error ($P_I$) based at least in part on the first error and the second error; and
calculating a weighted $P_E$ comprising a first gain applied to the $P_E$;
calculating a weighted $P_I$ comprising a second gain applied to the $P_I$; and
summing the weighted $P_E$ and the weighted $P_I$ to determine a total error ($P_T$).

13. The method as recited in claim 12, wherein the calculating the amount to adjust the first frequency further comprises:
comparing $P_T$ to a maximum adjustment; and
determining that $P_T$ is less than the maximum adjustment; and
and wherein $P_T$ comprises the amount to adjust the first frequency based at least in part on the determining that $P_T$ is less than the maximum adjustment.

14. A system comprising:
a sensor;
a trigger unit;
one or more processors; and
one or more computer-readable media storing computer-executable instructions that, when executed on the one or more processors, cause the one or more processors to perform acts comprising:
configuring the trigger unit to generate pulses at a first frequency;
calculating a first expected timestamp based at least in part on the first frequency;
storing first data acquired by the sensor, the sensor acquiring the first data in response to receiving a first pulse;
storing a first recorded timestamp corresponding to a first time at which the first pulse was generated;
associating at least one of the first recorded timestamp or the first expected timestamp with the first data;
analyzing the first recorded timestamp with respect to at least the first expected timestamp;
determining a first error based at least in part on the analyzing; and
configuring the trigger unit to generate pulses at a second frequency based at least in part on the first frequency and the first error.

15. The system as recited in claim 14, the acts further comprising:
calculating a first period, the first period based at least in part on the first frequency; and
determining a time indicated by a clock of a computing device coupled to the trigger unit;
and wherein the calculating the first expected timestamp is based at least in part on the first period and the time indicated by the clock.

16. The system as recited in claim 14, the acts further comprising:
calculating an amount to adjust the first frequency based at least in part on the first error; and
calculating the second frequency, the second frequency comprising the first frequency adjusted by the amount.

17. The system as recited in claim 14, wherein:
the analyzing comprises comparing the first recorded timestamp to a sum of a time indicated by the first expected timestamp and a time indicated by an intentional offset;
the determining the first error comprises determining the first error as a difference between the first recorded timestamp and the sum;
and the acts further comprise:

calculating an amount to adjust the first frequency based at least in part on the first error; and calculating the second frequency, the second frequency comprising the first frequency adjusted by the amount.

18. The system as recited in claim 14, the acts further comprising:

calculating a second expected timestamp;

storing second data acquired by the sensor, the sensor acquiring the second data in response to receiving a second pulse;

storing a second recorded timestamp corresponding to a second time at which the second pulse was generated;

associating at least one of the second recorded timestamp or the second expected timestamp with the second data;

analyzing the second recorded timestamp with respect to at least the second expected timestamp;

determining a second error based at least in part on the analyzing of the second recorded timestamp with respect to at least the second expected timestamp; and configuring the trigger unit to generate pulses at a third frequency based at least in part on the first frequency and the second error.

19. The system as recited in claim 18, the acts further comprising:

calculating an amount to adjust the first frequency based at least in part on the second error; and calculating the third frequency, the third frequency comprising the first frequency adjusted by the amount.

20. The system as recited in claim 19, wherein the calculating the amount to adjust the first frequency comprises:

calculating a proportional error ($P_E$) based at least in part on the second error;

calculating an integral error ($P_I$) based at least in part on the first error and the second error; and calculating a weighted $P_E$ comprising a first gain applied to the $P_E$;

calculating a weighted $P_I$ comprising a second gain applied to the $P_I$; and summing the weighted $P_E$ and the weighted $P_I$ to determine the amount.

* * * * *